(12) United States Patent
Nakamura

(10) Patent No.: US 11,562,155 B2
(45) Date of Patent: Jan. 24, 2023

(54) MICROCONTROLLER

(71) Applicants: Kabushiki Kaisha Toshiba, Tokyo (JP); Toshiba Electronic Devices & Storage Corporation, Tokyo (JP)

(72) Inventor: Yoshimi Nakamura, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 148 days.

(21) Appl. No.: 17/011,236

(22) Filed: Sep. 3, 2020

(65) Prior Publication Data

US 2021/0224493 A1 Jul. 22, 2021

(30) Foreign Application Priority Data

Jan. 22, 2020 (JP) .............................. JP2020-008131

(51) Int. Cl.
*G06K 7/00* (2006.01)
*G05B 19/042* (2006.01)

(52) U.S. Cl.
CPC ......... *G06K 7/0021* (2013.01); *G05B 19/042* (2013.01); *G05B 2219/25257* (2013.01)

(58) Field of Classification Search
CPC ........ G06K 19/07; G06K 7/00; G06K 7/0021; G05B 2219/25257
See application file for complete search history.

(56) References Cited

U.S. PATENT DOCUMENTS

| 7,913,916 | B2 | 3/2011 | Musial et al. |
| 2004/0129787 | A1* | 7/2004 | Saito .................... H04L 9/3231 235/492 |
| 2014/0210589 | A1 | 7/2014 | Grace |

FOREIGN PATENT DOCUMENTS

| JP | 2006-501583 A | 1/2006 |
| JP | 2008-129836 A | 6/2008 |
| JP | 4355247 B2 | 10/2009 |
| JP | 5049959 B2 | 10/2012 |
| JP | 5069569 B2 | 11/2012 |
| JP | 2012-238126 A | 12/2012 |
| JP | 5799754 B2 | 10/2015 |
| JP | 2016-511460 A | 4/2016 |
| WO | 2006-116772 A2 | 11/2006 |

* cited by examiner

*Primary Examiner* — Laura A Gudorf
(74) *Attorney, Agent, or Firm* — Allen & Overy LLP

(57) ABSTRACT

According to one embodiment, a microcontroller includes a processor, and a signal path that allows a signal conforming to an ISO7816 standard to be transferred between a card reader and a secure element without intervention of the processor.

14 Claims, 18 Drawing Sheets

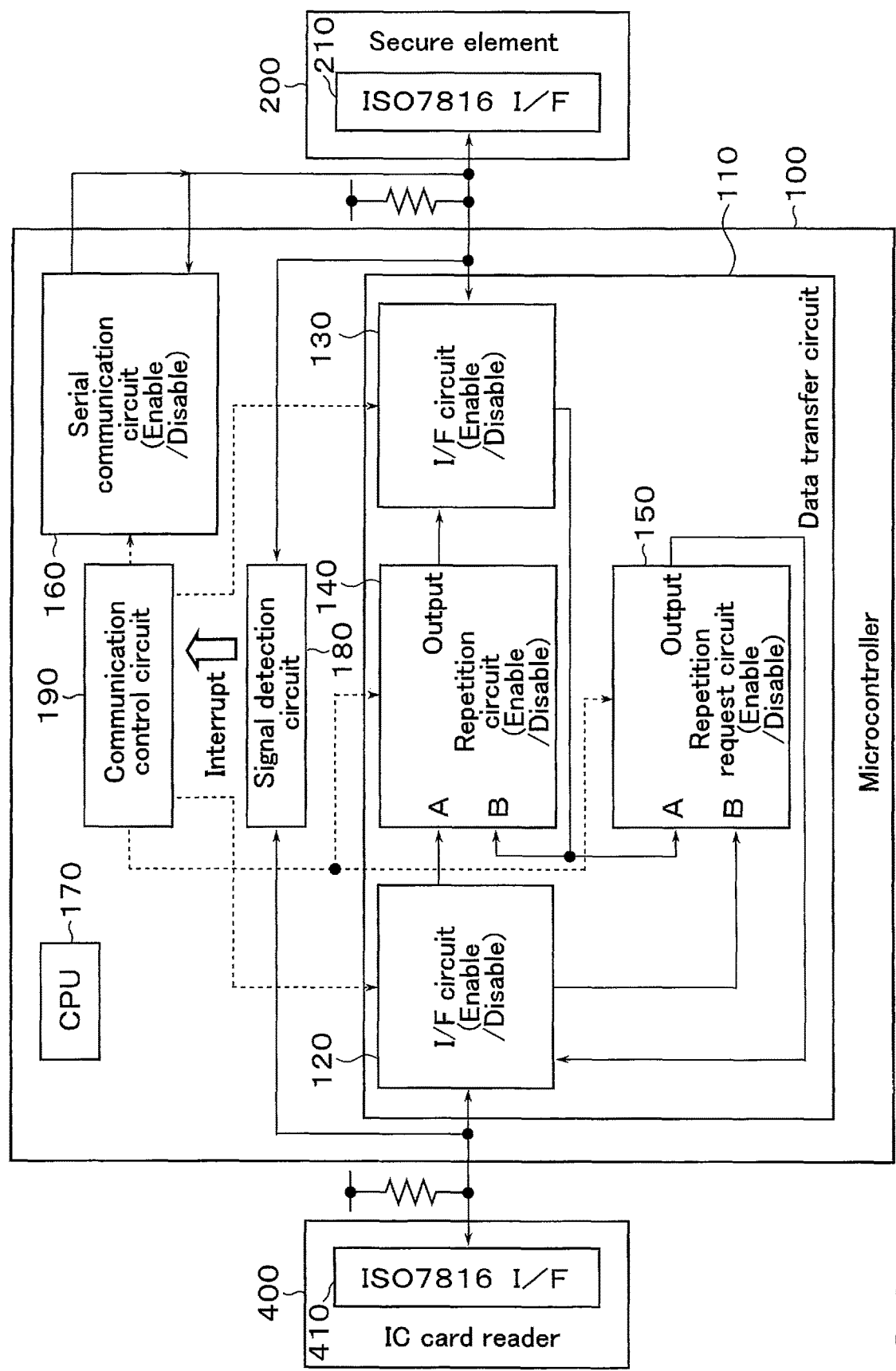
F I G. 2

|  | "H" | "L" |
|---|---|---|
| Input signal from secure element 200 (port A) / Input signal from IC card reader 400 (port B) | | |
| "H" | "H"(Hi-Z) | "L" |
| "L" | "H"(Hi-Z) | "H"(Hi-Z) |

FIG. 3A

|  | "H" | "L" |
|---|---|---|
| Input signal from secure element 200 (port B) / Input signal from IC card reader 400 (port A) | | |
| "H" | "H"(Hi-Z) | "H"(Hi-Z) |
| "L" | "L" | "H"(Hi-Z) |

FIG. 3B

MICROCONTROLLER

CROSS-REFERENCE TO RELATED APPLICATIONS

This application is based upon and claims the benefit of priority from Japanese Patent Application No. 2020-008131, filed Jan. 22, 2020, the entire contents of which are incorporated herein by reference.

FIELD

Embodiments described herein relate generally to a microcontroller.

BACKGROUND

A contact IC card equipped with a fingerprint verification function has been known. Such a contact IC card is expected to have a more advanced security function.

BRIEF DESCRIPTION OF THE DRAWINGS

FIG. 2 is a block diagram showing the microcontroller according to the first embodiment.

FIG. 3A is a conceptual drawing of a table that defines output signals of a repetition request circuit included in the microcontroller according to the first embodiment.

FIG. 3B is a conceptual drawing of a table that defines output signals of a repetition circuit included in the microcontroller according to the first embodiment.

DETAILED DESCRIPTION

In general, according to one embodiment, a microcontroller includes a processor, and a signal path that allows a signal conforming to an ISO7816 standard to be transferred between a card reader and a secure element without intervention of the processor.

Hereinafter, embodiments will be described with reference to the accompanying drawings. In the following description, components having the same functions and configurations will be denoted by the common reference symbols.

1. First Embodiment

A microcontroller according to the first embodiment will be described. Hereinafter, a contact IC card that includes a microcontroller, is equipped with a fingerprint verification function, and conforms to the ISO7816 standard will be described as an example.

1.1 Configuration 1.1.1 Overall Configuration of Contact IC Card First, an overall configuration of a contact IC card including a microcontroller according to the present embodiment will be described with reference to FIG. 1. A contact IC card 1 according to the present embodiment is physically inserted into, e.g., an IC card reader 400. By this insertion, an interface circuit of the IC card reader 400 and an interface circuit of the contact IC card 1 are electrically connected to each other, thereby becoming mutually communicable.

Figure 1:
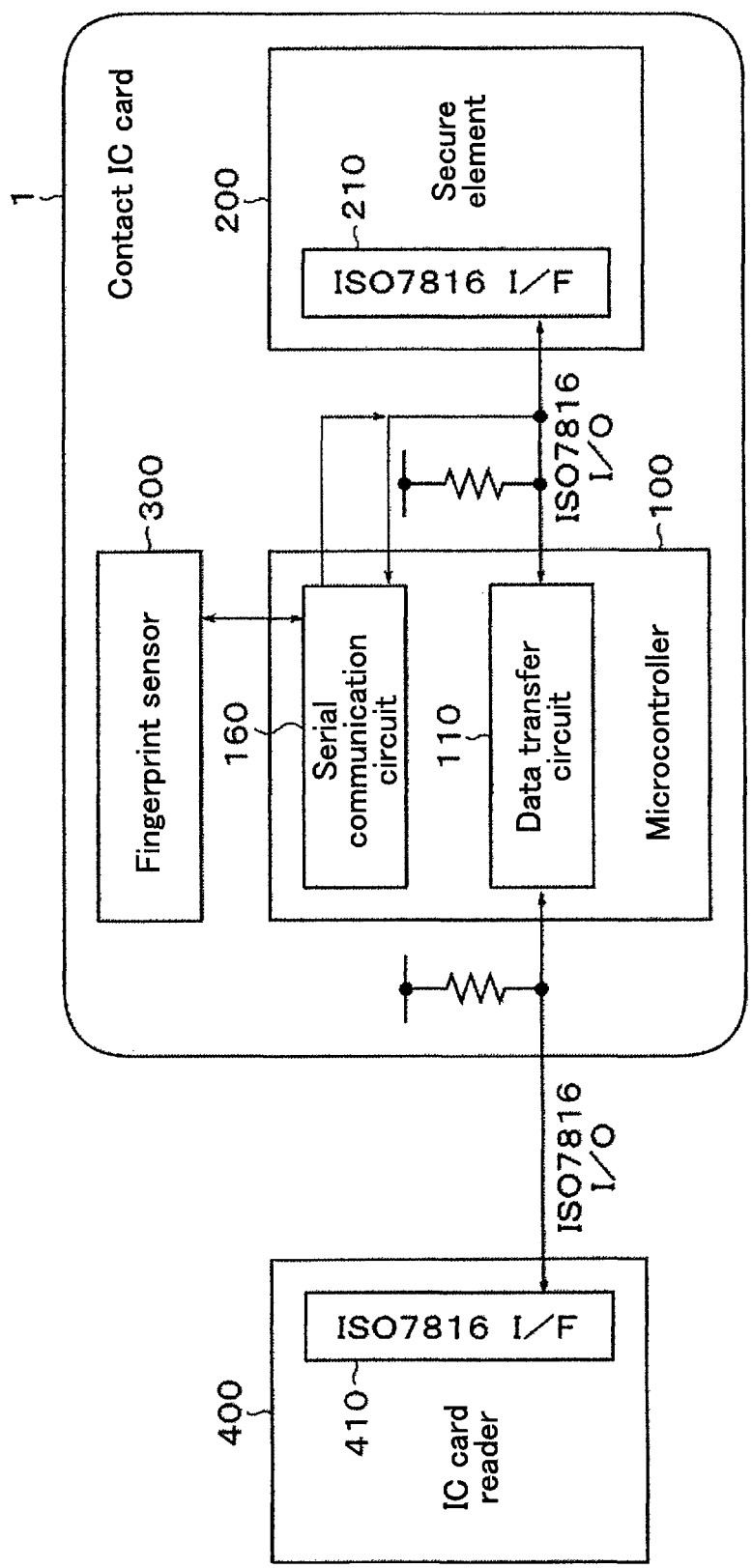
FIG. 1 is a block diagram showing a contact IC card having a microcontroller according to a first embodiment.

As shown in FIG. 1, the contact IC card 1 includes a microcontroller 100, a secure element 200, and a fingerprint sensor 300.

The microcontroller 100 controls operation of the whole contact IC card 1. The microcontroller 100 is connectable to the IC card reader 400. The microcontroller 100 is configured to transmit and receive various signals to and from each of the IC card reader 400, the secure element 200, and the fingerprint sensor 300, and to execute various types of processing. One example of the processing is a fingerprint verification operation in which fingerprint data on a card user received from the fingerprint sensor is collated with pre-registered fingerprint information (template) on the card user received from the secure element 200. The microcontroller 100 validates a transaction with the IC card reader 400 if the fingerprint verification operation results in success. The microcontroller 100 invalidates the aforementioned transaction if the fingerprint verification operation results in failure.

The secure element 200 encrypts and stores confidential data on a card user such as personal information, password, fingerprint information, etc. The secure element 200 transmits the encrypted confidential data to the microcontroller 100, as needed. Specifically, the secure element 200 is a circuit block configured to hold and process confidential data.

More specifically, the secure element 200 includes a processor (not shown), a nonvolatile memory (not shown), and an ISO7816 interface circuit 210. The ISO7816 interface circuit 210 manages communication with the microcontroller 100. The ISO7816 interface circuit 210 is configured to transmit and receive signals conforming to the ISO7816 standard, signals relating to fingerprint verification, etc. The processor performs processing on signals received from the microcontroller 100. Concrete examples of this processing include encryption and decryption of confidential data, detection of a data error, etc. In the case of detecting a data error, the processor transmits an error signal (for example, a 1-bit signal of level "L") to the microcontroller 100. The nonvolatile memory is configured to hold in a nonvolatile manner encrypted confidential data, data received from the microcontroller 100, and data processed by the processor, etc.

The fingerprint sensor 300 reads a fingerprint when a card user touches a sensor part (not shown) with his or her finger. The fingerprint sensor 300 extracts a read image or extracts data on feature points of the fingerprint from the read image (hereinafter, such data will be simply referred to as "fingerprint data"). The fingerprint sensor 300 transmits the fingerprint data to the microcontroller 100.

1.1.2 Configuration of Microcontroller 100

Next, a configuration of the microcontroller 100 according to the present embodiment will be described in detail with reference to FIG. 2. As shown in FIG. 2, the microcontroller 100 includes a data transfer circuit 110, a serial communication circuit 160, a processor (CPU) 170, a signal detection circuit 180, and a communication control circuit 190. In FIG. 2, a data line is indicated by the solid line, whereas a control line is indicated by the broken line. The microcontroller 100 may hold a ROM that stores programs for control, etc., and a RAM used as a working space for the processor 170. However, their illustration is omitted.

The data transfer circuit 110 functions as a signal path through which signals conforming to the ISO7816 standard (for example, a communication character, a signal including a collation result obtained from fingerprint verification, etc.), error signals mentioned above, etc., can be transferred between the IC card reader 400 and the secure element 200.

More specifically, the data transfer circuit 110 receives a signal from one of an ISO7816 interface circuit 410 of the IC card reader 400 and an ISO7816 interface circuit 210 of the secure element 200, by way of a bus, in accordance with an ISO7816 interface (hereinafter, simply referred to as "ISO7816 bus"). The data transfer circuit 110 transfers a signal based on the received signal to the other one of the ISO7816 interface circuit 410 and the ISO7816 interface circuit 210.

Resistance elements are respectively connected to the ISO7816 bus between the data transfer circuit 110 and the IC card reader 400, and to the ISO7816 bus between the data transfer circuit 110 and the secure element 200. These resistance elements are tasked with pulling up voltages of signals transferred by the ISO7816 buses.

The data transfer circuit 110 includes interface circuits 120 and 130, a repetition circuit 140, and a repetition request circuit 150.

The interface circuit 120 is connectable to the IC card reader 400 by way of the ISO7816 bus, and manages input and output processing with respect to the IC card reader 400. The interface circuit 120 manages output processing of signals to the repetition circuit 140, and input and output processing of signals with respect to the repetition request circuit 150.

More specifically, the interface circuit 120 takes any of an "input enable" state, an "output enable" state, and a "disable" state. The "input enable" state permits the reception of signals from the IC card reader 400. This state further permits the interface circuit 120 to output signals received from the IC card reader 400 to the repetition circuit 140, while disabling input and output of signals with respect to the repetition request circuit 150. The "output enable" state permits output of signals to the IC card reader 400. This state further permits the interface circuit 120 to output, to the repetition request circuit 150, signals pulled up to level "H" by the resistance element connected to the ISO7816 bus, and to receive signals from the repetition request circuit 150, while disabling output of signals to the repetition circuit 140. The "disable" state prohibits input and output of signals with respect to the IC card reader 400. This state further prohibits the interface circuit 120 from outputting signals to the repetition circuit 140, and from inputting and outputting signals with respect to the repetition request circuit 150. The state taken by the interface circuit 120 is controlled by the communication control circuit 190.

The interface circuit 130 is connected to the secure element 200 by way of the ISO7816 bus, and manages input and output processing of signals with respect to the secure element 200. The interface circuit 130 manages output processing of signals to the repetition request circuit 150, and input and output processing of signals with respect to the repetition circuit 140.

More specifically, the interface circuit 130 takes any of the "input enable" state, the "output enable" state, and the "disable" state. The "input enable" state permits the reception of signals from the secure element 200. This state further permits the interface circuit 130 to output signals received from the secure element 200 to the repetition request circuit 150, while disabling input and output of signals with respect to the repetition circuit 140. The "output enable" state permits output of signals to the secure element 200. This state further permits the interface circuit 130 to output, to the repetition circuit 140, signals pulled up to level "H" by the resistance element connected to the ISO7816 bus, and to receive signals from the repetition circuit 140, while disabling output of signals to the repetition request circuit 150. The "disable" state prohibits input and output of signals with respect to the secure element 200. This state further prohibits the interface circuit 130 from outputting signals to the repetition request circuit 150, and from inputting and outputting signals with respect to the repetition circuit 140. The state taken by the interface circuit 130 is controlled by the communication control circuit 190.

The repetition request circuit 150 has two input ports (port A and port B) configured to receive signals, and an output port configured to output signals. The port A is configured to receive signals from the interface circuit 130. The port B is configured to receive signals from the interface circuit 120. The output port is configured to output signals to the interface circuit 120.

The repetition request circuit 150 has a function of receiving a signal (e.g., a signal including the aforementioned collation result) that is transmitted from the secure element 200 and conforms to the ISO7816 standard, and transferring to the IC card reader 400 a signal that is based on the received signal and conforms to the ISO7816 standard. The repetition request circuit 150 has a repetition request function of receiving a signal (e.g., the aforementioned error signal) transmitted from the secure element 200, determining based on the received signal whether or not a repetition request for a communication character is necessary, and outputting a signal for requesting repetition of the communication character if it is determined that the repetition request is necessary.

More specifically, the repetition request circuit 150 takes either an "enable" state or a "disable" state. The "enable" state permits input and output of signals with respect to the interface circuit 120, and reception of signals from the interface circuit 130. The "disable" state prohibits input and output of signals with respect to the interface circuit 120, and prohibits receipt of signals from the interface circuit 130. The state taken by the repetition request circuit 150 is controlled by the communication control circuit 190.

In the "enable" state, if the port A receives a signal of level "L" from the interface circuit 130 while the port B receives a signal of level "H" from the interface circuit 120, the repetition request circuit 150 determines that repetition of the communication character from the IC card reader 400 is necessary. By outputting a signal of level "L" to the interface circuit 120, the repetition request circuit 150 requests repetition of the communication character. A signal that the repetition request circuit 150 outputs to the interface circuit 120 is determined, for example, based on a table shown in FIG. 3A.

FIG. 3A defines output signals each based on both an input signal transmitted from the secure element 200 and received by way of the port A of the repetition request circuit 150, and an input signal transmitted from the IC card reader 400 and received by way of the port B. If a signal of level "L" is received by way of the port A and a signal pulled up to level "H" by the resistance element is received by way of the port B, the repetition request circuit 150 outputs signal of level "L". Except for the above case, the output port of the repetition request circuit 150 is in a high-impedance state (Hi-Z).

The repetition circuit 140 has two input ports (port A and port B) configured to receive signals, and an output port configured to output signals. The port A is configured to receive signals from the interface circuit 120. The port B is configured to receive signals from the interface circuit 130. The output port is configured to output signals to the interface circuit 130.

The repetition circuit 140 has a function of receiving a signal (e.g., a communication character) that is transmitted from the IC card reader 400 and conforms to the ISO7816 standard, and transferring to the secure element 200 a signal that is based on the received signal and conforms to the ISO7816 standard. The repetition circuit 140 has a function of receiving a signal (e.g., a repeated communication character) that is repeated from the IC card reader 400 and conforms to the ISO7816 standard, and transferring to the secure element 200 a signal that is based on the received signal and conforms to the ISO7816 standard.

More specifically, the repetition circuit 140 takes either an "enable" state or a "disable" state. The "enable" state permits reception of signals from the interface circuit 120, and input and output of signals with respect to the interface circuit 130. The "disable" state prohibits reception of signals from the interface circuit 120, and prohibits input and output of signals with respect to the interface circuit 130. The state taken by the repetition circuit 140 is controlled by the communication control circuit 190.

In the "enable" state, the repetition circuit 140 outputs a signal based on both a signal received by way of the port A and a signal received by way of the port B. A signal that the repetition circuit 140 outputs to the interface circuit 130 is determined, for example, based on a table shown in FIG. 3B.

FIG. 3B defines output signals each based on both an input signal transmitted from the IC card reader 400 and received by way of the port A of the repetition circuit 140, and an input signal transmitted from the secure element 200 and received by way of the port B. As in FIG. 3A, if a signal of level "L" is received by way of the port A and a signal pulled up to level "H" by the resistance element is received by way of the port B, the repetition circuit 140 outputs a signal of level "L".

Except for the above case, the output port of the repetition circuit 140 is in a high-impedance state (Hi-Z).

The tables shown in FIGS. 3A and 3B are stored in, e.g., a ROM (not shown) within the microcontroller 100, and are read to a RAM (not shown) within the microcontroller 100 when voltage is supplied from the IC card reader 400 to the microcontroller 100. After the tables are read out, they are transferred to the repetition circuit 140 and the repetition request circuit 150. The repetition circuit 140 and the repetition request circuit 150 perform a computation in accordance with the transferred tables. The repetition circuit 140 and the repetition request circuit 150 may include a logic circuit configured to perform such a computation.

The serial communication circuit 160 is connected to the ISO7816 interface circuit 210 of the secure element 200 by way of a bus conforming to a serial communication standard, and performs a serial communication with the secure element 200. Examples of the serial communication include Inter-Integrated Circuit (I2C), Serial Peripheral Interface (SPI), etc. The serial communication circuit 160 is further connected to the fingerprint sensor 300 by way of the bus conforming to the serial communication standard, and performs the serial communication with the fingerprint sensor 300.

More specifically, the serial communication circuit 160 takes either an "enable" state or a "disable" state. The "enable" state permits a serial communication with the ISO7816 interface circuit 210 of the secure element 200. The "disable" state prohibits the serial communication with the ISO7816 interface circuit 210 of the secure element 200. The state taken by the serial communication circuit 160 is controlled by the communication control circuit 190.

The processor 170 controls operation of the entire microcontroller 100. For example, the processor 170 controls operation of the serial communication circuit 160, the signal detection circuit 180, and the communication control circuit 190.

The signal detection circuit 180 determines whether a signal that transits over the ISO7816 bus has been detected or not.

More specifically, in the case of not detecting a signal transmitted from the IC card reader 400 or the secure element 200 for a certain period conforming to the ISO7816 standard, the signal detection circuit 180 transmits, to the communication control circuit 190, signal indicating the fact that no signal has been detected. Accordingly, the communication control circuit 190 is interrupted by control processing.

The signal detection circuit 180 further monitors a signal that transits over the ISO7816 bus. Based on this signal, the signal detection circuit 180 detects a specific signal being transmitted from the IC card reader 400 or the secure element 200. Examples of the specific signal include the aforementioned error signal transmitted from the secure element 200, a communication character repeated from the IC card reader 400 in response to a request from the microcontroller 100, etc.

More specifically, in the case of detecting an error signal transmitted from the secure element 200, the signal detection circuit 180 transmits, to the communication control circuit 190, a signal indicating the fact that the error signal has been detected. On the other hand, in the case of detecting the communication character repeated from the IC card reader 400, the signal detection circuit 180 transmits to the communication control circuit 190 a signal indicating the fact that the repeated communication character has been detected. Accordingly, the communication control circuit 190 is interrupted by control processing.

Upon receipt of a signal from the signal detection circuit 180, the communication control circuit 190 controls based on the received signal, the interface circuits 120 and 130 in terms of their "input enable" state, "output enable" state, and "disable" state, the repetition circuit 140 in terms of its "enable" state and "disable" state, the repetition request circuit 150 in terms of its "enable" state and "disable" state, and the serial communication circuit 160 in terms of its "enable" state and "disable" state.

Regarding a repetition request function for a communication character using the repetition request circuit 150, and a repetition function of the communication character using the repetition circuit 140, details of these functions will be described in the second embodiment.

1.2 Operation of Microcontroller 100

Figure 4A:
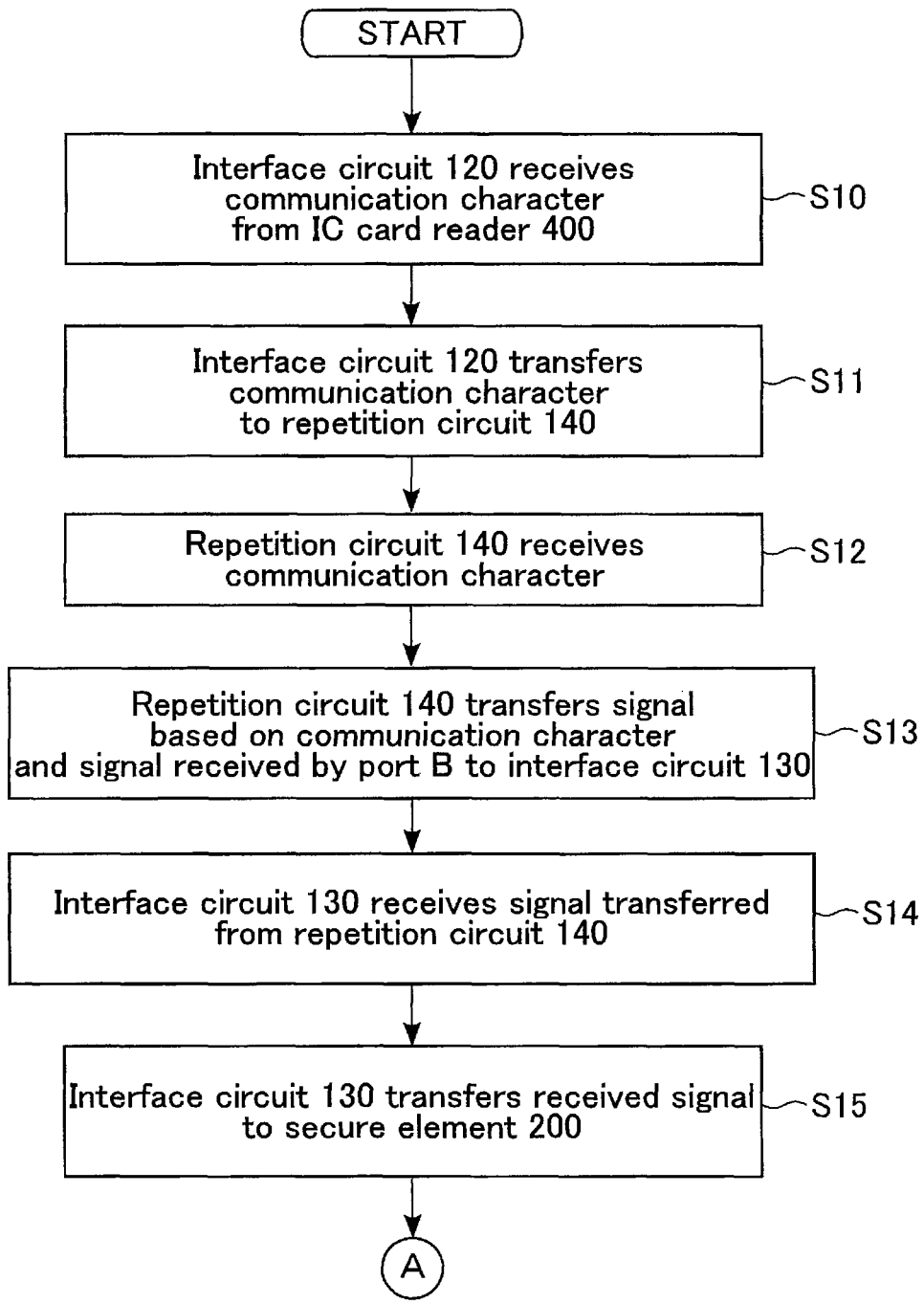
FIG. 4A is a flow chart showing operation of the microcontroller in its initial state according to the first embodiment.
Figure 4B:
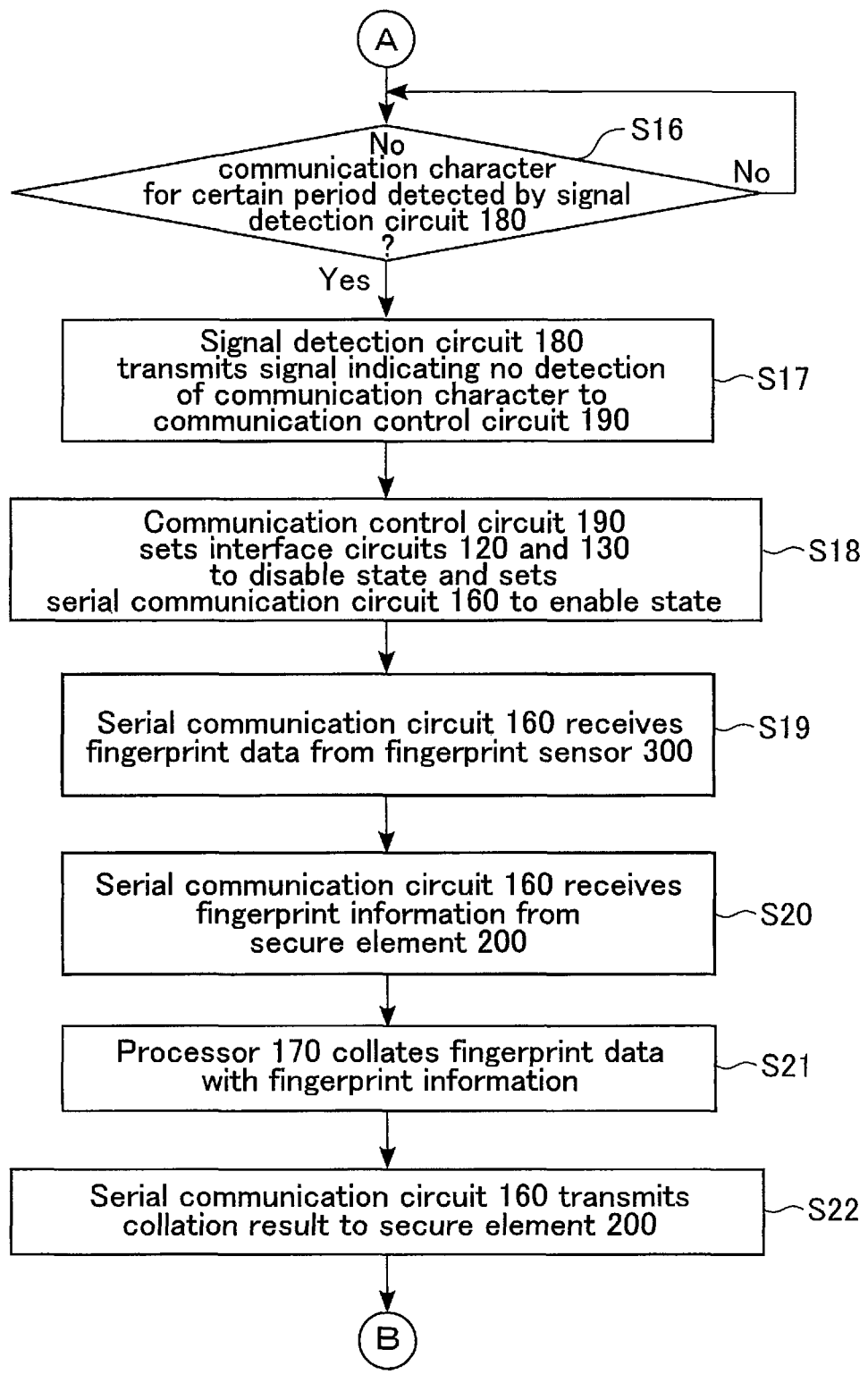
FIG. 4B is a flow chart showing operation when the microcontroller according to the first embodiment transitions from a payment authentication processing mode to a fingerprint collation mode to perform fingerprint verification.
Figure 4C:
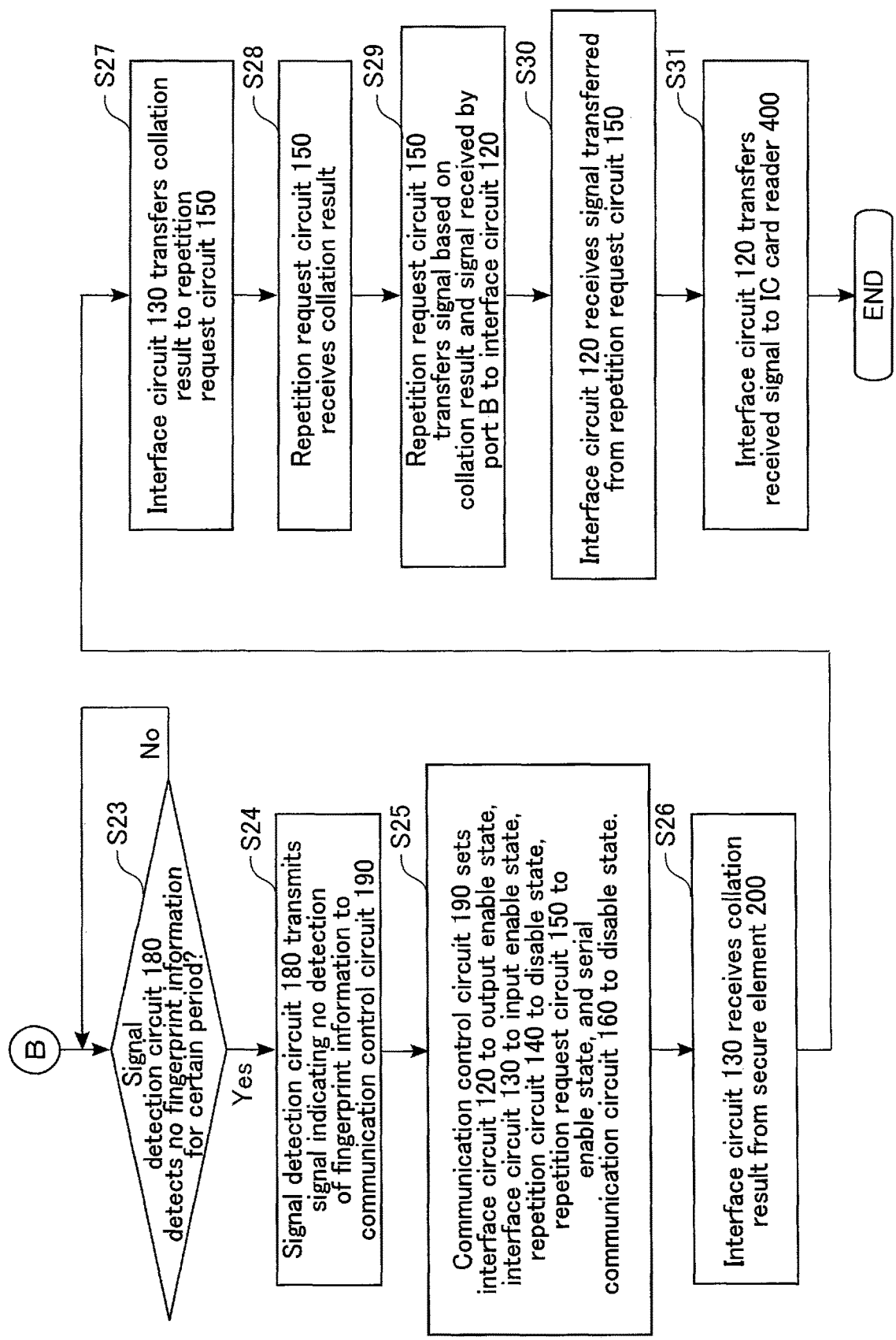
FIG. 4C is a flow chart showing operation when the microcontroller according to the first embodiment transitions from the fingerprint collation mode to the payment authentication processing mode to transfer a fingerprint collation result.

Next, operation of the microcontroller 100 according to the present embodiment will be described. FIGS. 4A to 4C are each a flow chart showing operation of the microcontroller 100. Symbol A in FIG. 4A is continuous with symbol A in FIG. 4B in chronological order. Symbol B in FIG. 4B is continuous with symbol B in FIG. 4C in chronological order. The case described below as an example assumes that the contact IC card 1 is a credit card, and, in a shop, a user performs transaction payment authentication for a commodity price by inserting the credit card into the IC card reader 400. In this case, the microcontroller 100 has a payment authentication processing mode and a fingerprint collation mode.

First, operation of the microcontroller 100 in the initial state will be described with reference to FIG. 4A. In the initial state, the microcontroller 100 is set to the payment authentication processing mode, the interface circuit 120 is set to the "input enable" state, the interface circuit 130 is set to the "output enable" state, the repetition circuit 140 is set to the "enable" state, the repetition request circuit 150 is set to the "disable" state, and the serial communication circuit 160 is set to the "disable" state. This validates a communication between the IC card reader 400 and the secure element 200 by way of the data transfer circuit 110, and invalidates a serial communication between the serial communication circuit 160 and the secure element 200.

When the contact IC card 1 is inserted into the IC card reader 400, the microcontroller 100 is electrically connected to the IC card reader 400, thereby causing the supply of a voltage, a clock signal, etc., from the IC card reader 400 to the contact IC card 1. The microcontroller 100 enters a state in which it is operable using the supplied voltage as a power supply voltage. Furthermore, as shown in FIG. 4A, the interface circuit 120 of the microcontroller 100 receives a communication character from the IC card reader 400 (step S10). This communication character corresponds to, for example, data for enabling a communication between the IC card reader 400 and the secure element 200, data for enabling payment authentication processing, etc. Upon receipt of the communication character, the interface circuit 120 transfers the received communication character to the port A of the repetition circuit 140 (step S11).

Upon receipt of the communication character (step S12), the repetition circuit 140 transfers, to the interface circuit 130, a signal based on the received communication character and a signal received by way of the port B (step S13). At this time, as described with reference to FIG. 3B, the port B receives a signal of level "H". Thus, the repetition circuit 140 outputs a signal (Hi-Z) of level "H" if the respective bits of the communication character (10 bits) are at level "H". The repetition circuit 140 outputs a signal of level "L" if the respective bits of the communication character are at level "L". Specifically, the communication character received from the IC card reader 400 is transferred in its current form to the interface circuit 130.

Upon receipt of the signal (communication character) transferred from the repetition circuit 140 (step S14), the interface circuit 130 transfers this signal to the secure element 200 (step S15). Specifically, the signal transmitted from the IC card reader 400 passes through the microcontroller 100, thereby being transferred to the secure element 200. When the secure element 200 successfully receives the communication character, a communication between the IC card reader 400 and the secure element 200 is completed (preparation for payment authentication processing is completed). In steps S10 to S15, the processor 170 does not perform a computation using the communication character. In other words, in steps S10 to S15, a signal transferred from the IC card reader 400 to the secure element 200 has no effect on operation of the processor 170 of the microcontroller 100.

Figure 4D:
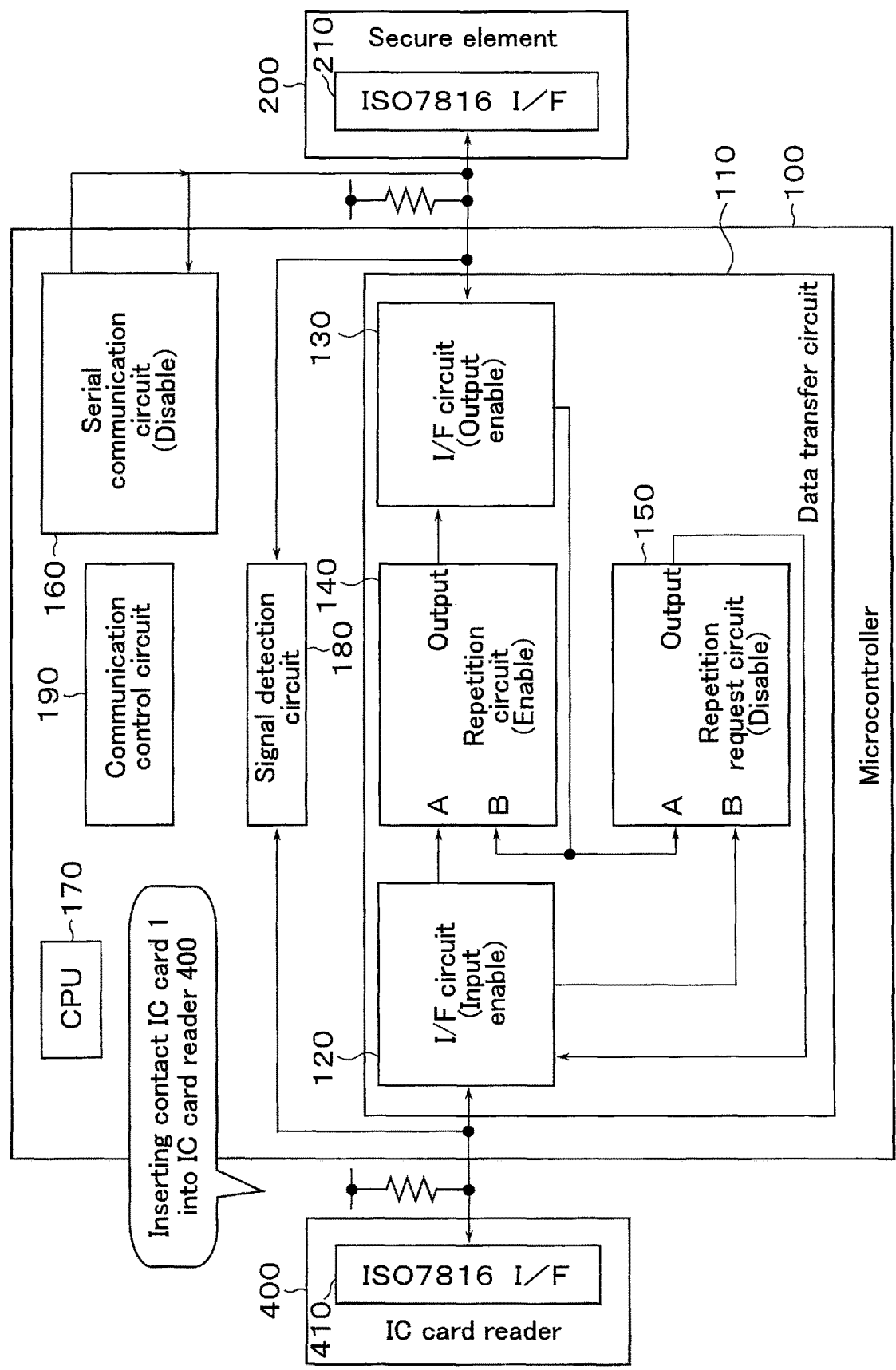
FIG. 4D is a block diagram showing the microcontroller according to the first embodiment.
Figure 4E:
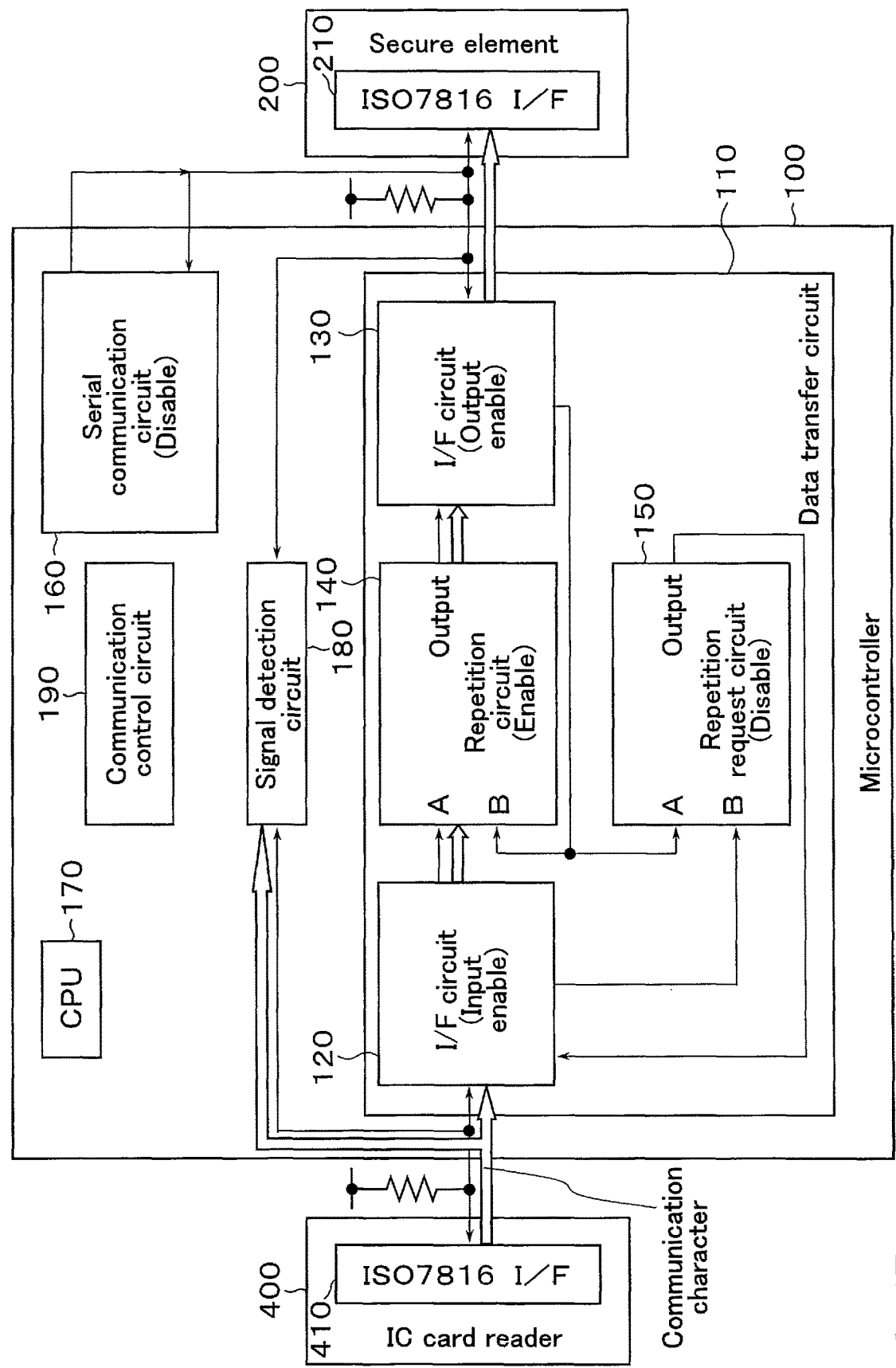
FIG. 4E is a block diagram showing the microcontroller according to the first embodiment.

FIGS. 4D and 4E illustrate operation of the microcontroller 100 and transfer of a communication character in FIG. 4A. FIG. 4D is a block diagram showing the microcontroller 100 when the contact IC card 1 is inserted into the IC card reader 400. FIG. 4E is a block diagram showing the microcontroller 100 when steps S10 to S15 in FIG. 4A are executed.

As shown in FIG. 4D, the contact IC card 1 is inserted into the IC card reader 400. At this time, the interface circuits 120 and 130 are respectively in the "input enable" state and the "output enable" state. The repetition circuit 140 is in the "enable" state. The repetition request circuit 150 is in the "disable" state. The serial communication circuit 160 is in the "disable" state. In this condition, a communication character is transmitted from the IC card reader 400 to the contact IC card 1 as shown in FIG. 4E. This communication character is then transferred in its current form to the ISO7816 interface circuit 210 of the secure element 200 by way of the interface circuit 120, the repetition circuit 140, and the interface circuit 130 within the data transfer circuit 110.

Regarding a signal that the microcontroller 100 receives from the IC card reader 400, the whole description contains the expression that the microcontroller 100 transfers this signal "in its current form" to the secure element 200, and the expression that this signal "passes through" the microcontroller 100 and is transferred to the secure element 200. However, these expressions do not always indicate the case in which a signal is completely unchanged. In the embodiment described above, by virtue of the computation shown in FIG. 3B being performed, a signal of "L"/"H" given by the IC card reader 400 is transferred with its bit string in its current form (with a bit string unchanged) to the secure element 200. However, the same signal is not necessarily transferred, provided that a "content" indicated by a signal transmitted from the IC card reader 400 is transferred in its current form (with a content unchanged) to the secure element 200. Therefore, a bit string may be inversed by the microcontroller 100, for example. In such a case, the secure element 200 may recognize that a bit string from the IC card reader 400 is inversed and is thereafter received. As a matter of course, other cases may also be acceptable.

Next, operation when the microcontroller 100 transitions from the payment authentication processing mode to the fingerprint collation mode to perform fingerprint verification will be described with reference to FIG. 4B.

As shown in FIG. 4B, in the payment authentication processing mode, if the signal detection circuit 180 does not detect a communication character that transits over the ISO7816 bus for a certain period conforming to the ISO7816 standard after the communication character is transferred to the secure element 200 (step S16, Yes), the signal detection circuit 180 transmits to the communication control circuit 190 a signal indicating the fact that the communication character has not been detected (step S17). Then, it is determined that a communication between the IC card reader 400 and the secure element 200 has been completed, and the communication control circuit 190 causes the microcontroller 100 to transition to the fingerprint collation mode. Specifically, the communication control circuit 190 sets the interface circuits 120 and 130 to the "disable" state and the serial communication circuit 160 to the "enable" state (step S18). This setting of states validates a serial communication between the serial communication circuit 160 and the secure element 200, and invalidates a communication between the IC card reader 400 and the secure element 200 by way of the data transfer circuit 110.

After the microcontroller 100 transitions to the fingerprint collation mode, by virtue of a user touching the fingerprint sensor 300 with his or her finger, the fingerprint sensor 300 accepts the user's fingerprint. Then the serial communication circuit 160 receives the user fingerprint data from the fingerprint sensor 300 (step S19), and further receives, from the secure element 200, a signal including pre-registered user fingerprint information (step S20). The processor 170 collates the fingerprint data received in step S19 and the fingerprint information received in step S20 (step S21). More specifically, the processor 170 obtains in step S19 the fingerprint data on a user who has touched the fingerprint sensor 300 with his or her finger, and obtains in step S20 pre-registered user fingerprint information, thereby comparing the data obtained in step S19 with that obtained in step S20. That is, the processor 170 performs a computation regarding whether or not the fingerprint information received from the secure element 200 and the fingerprint data received from the fingerprint sensor 300 collate and match with each other. When a collation result is obtained, the serial communication circuit 160 transmits the collation result to the secure element 200 (step S22). When the secure element 200 receives the collation result, a communication between the serial communication circuit 160 and the secure element 200 is completed (fingerprint collation is completed).

On the other hand, if the signal detection circuit 180 detects a communication character that transits over the ISO7816 bus within a certain period conforming to the ISO7816 standard (step S16, No), in other words, if a communication between the IC card reader 400 and the secure element 200 is not completed, the microcontroller 100 maintains the payment authentication processing mode, thereby transferring the communication character to the secure element 200. The microcontroller 100 then performs again step S16 described above until a communication between the IC card reader 400 and the secure element 200 is completed.

Figure 4F:
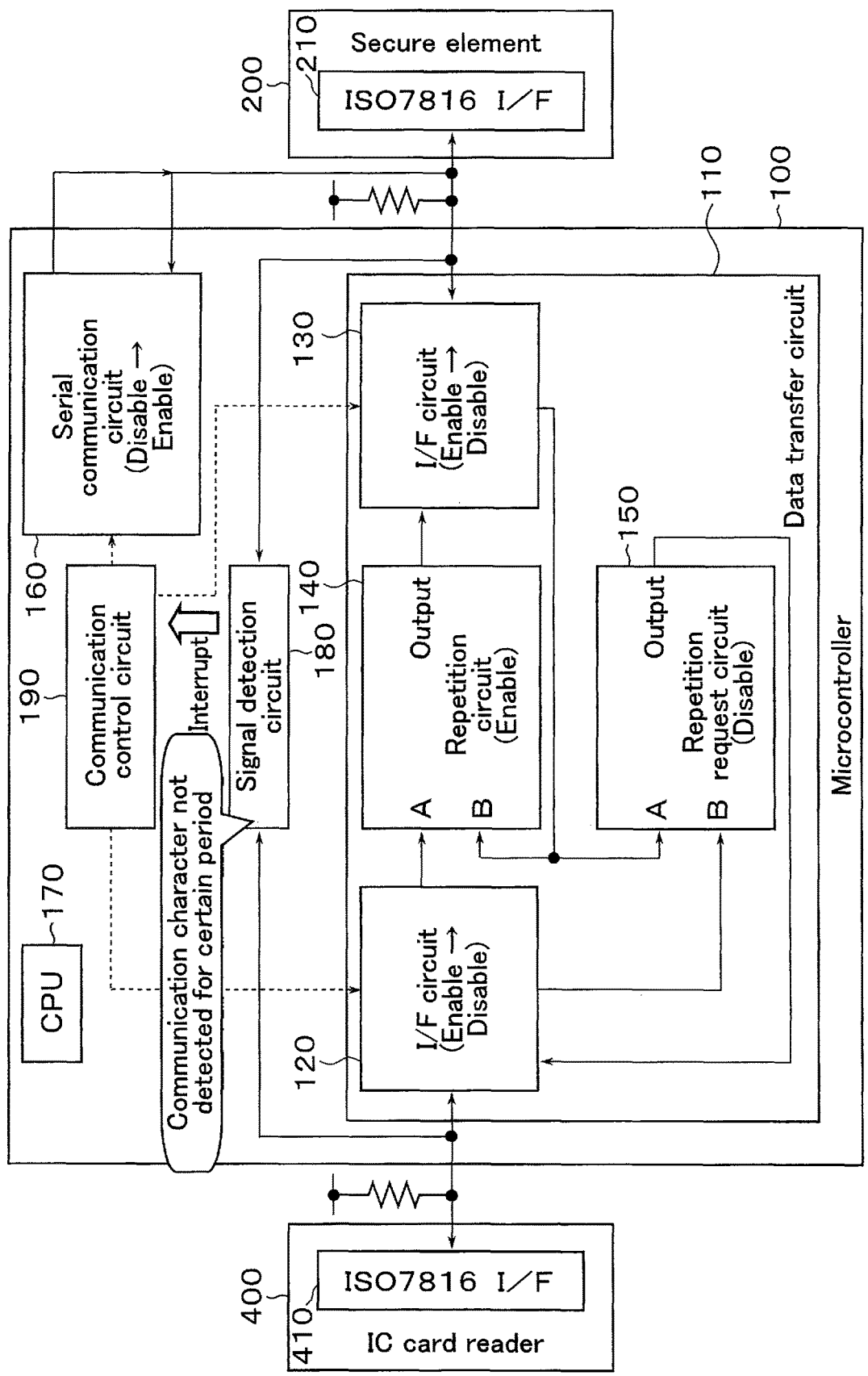
FIG. 4F is a block diagram showing the microcontroller according to the first embodiment.
Figure 4G:
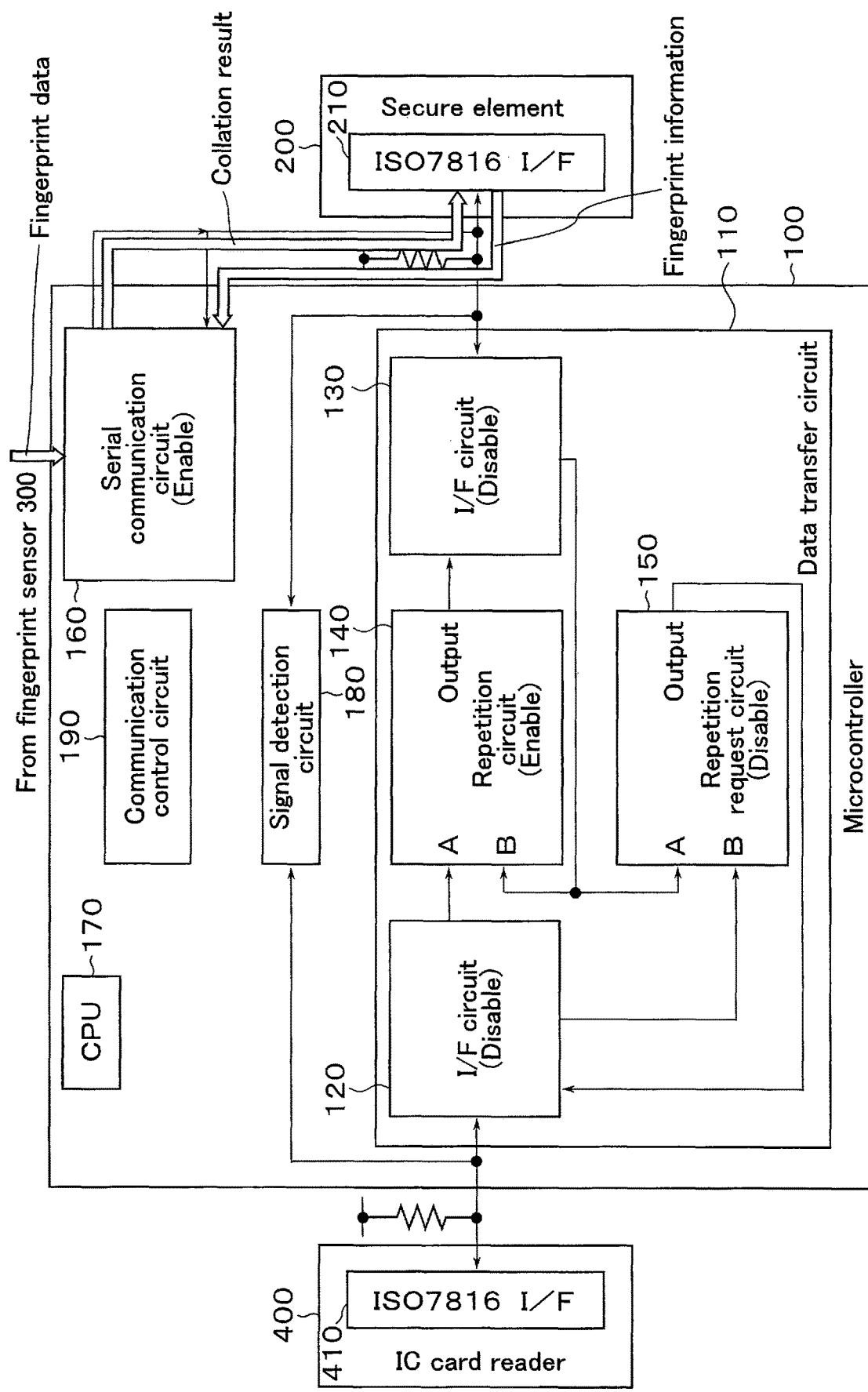
FIG. 4G is a block diagram showing the microcontroller according to the first embodiment.

FIGS. 4F and 4G illustrate operation of the microcontroller 100 and data transfer in FIG. 4B. FIG. 4F is a block diagram showing the microcontroller 100 when steps S16 to S18 in FIG. 4B are executed. FIG. 4G is a block diagram showing the microcontroller 100 when steps S19 to S22 in FIG. 4B are executed.

As shown in FIG. 4F, if the signal detection circuit 180 does not detect for a certain period, a communication character that transits over the ISO7816 bus, the communication control circuit 190 changes the setting of states of the interface circuits 120 and 130 and the serial communication circuit 160 based on a signal received from the signal detection circuit 180. Specifically, the communication control circuit 190 changes the states of both the interface circuits 120 and 130 into the "disable" state, and the serial communication circuit 160 into the "enable" state. In this condition, the user fingerprint data is subsequently transmitted from the fingerprint sensor 300 to the serial communication circuit 160, as shown in FIG. 4G, and a signal including user fingerprint information is transmitted from the ISO7816 interface circuit 210 of the secure element 200 to the serial communication circuit 160. After the processor 170 collates the user fingerprint data with the fingerprint information, a collation result is transmitted from the serial communication circuit 160 to the ISO7816 interface circuit 210 of the secure element 200.

Next, operation when the microcontroller 100 transitions from the fingerprint collation mode to the payment authentication processing mode to transfer a fingerprint collation result will be described with reference to FIG. 4C.

As shown in FIG. 4C, in the fingerprint collation mode, when a collation result is transmitted to the secure element 200, a communication between the secure element 200 and the microcontroller 100 is stopped. Thereafter, if the signal detection circuit 180 does not detect a signal including user fingerprint information that transits over the ISO7816 bus for a certain period conforming to the ISO7816 standard (step S23, Yes), the signal detection circuit 180 transmits, to the communication control circuit 190, a signal indicating the fact that a signal including user fingerprint information has not been detected (step S24). Then, it is determined that a communication between the serial communication circuit 160 and the secure element 200 has been completed, and the communication control circuit 190 causes the microcontroller 100 to make transition to the payment authentication processing mode. Specifically, the communication control circuit 190 sets the interface circuit 120 to the "output enable" state, the interface circuit 130 to the "input enable" state, the repetition circuit 140 to the "disable" state, the repetition request circuit 150 to the "enable" state, and the serial communication circuit 160 to the "disable" state (step S25). This setting of states validates a communication between the IC card reader 400 and the secure element 200 by way of the data transfer circuit 110, and invalidates a serial communication between the serial communication circuit 160 and the secure element 200.

After the microcontroller 100 transitions to the payment authentication processing mode, when a signal including a collation result is transmitted from the secure element 200, the interface circuit 130 receives the signal including the collation result from the secure element 200 (step S26). The interface circuit 130 then transfers the signal including the collation result to the repetition request circuit 150 (step S27).

Upon receipt of the signal including the collation result (step S28), the repetition request circuit 150 transfers, to the interface circuit 120, a signal based on the received signal including the collation result and a signal received by way of the port B (step S29). At this time, as described with reference to FIG. 3A, the port B receives a signal of level "H". Thus, the repetition request circuit 150 outputs a signal (Hi-Z) of level "H" if the respective bits of the signal including the collation result (10 bits) are at level "H". The repetition request circuit 150 outputs a signal of level "L" if the respective bits of the signal including the collation result are at level "L". Specifically, the signal including the collation result received from the secure element 200 is transferred in its current form to the interface circuit 120.

Upon receipt of the signal (signal including a collation result) transferred from the repetition request circuit 150 (step S30), the interface circuit 120 transfers this signal to the IC card reader 400 (step S31). Specifically, the signal transmitted from the secure element 200 passes through the microcontroller 100, thereby being transferred to the IC card reader 400. In steps S23 to S31, the processor 170 does not perform a computation using the signal including the collation result. In other words, in steps S23 to S31, a signal transferred from the secure element 200 to the IC card reader 400 has no effect on operation of the processor 170 of the microcontroller 100.

On the other hand, if the signal detection circuit 180 detects a signal including user fingerprint information that transits over the ISO7816 bus within a certain period conforming to the ISO7816 standard (step S23, No), in other words, if a communication between the serial communication circuit 160 and the secure element 200 is not completed, the microcontroller 100 maintains the fingerprint collation mode, thereby performing fingerprint verification. The microcontroller 100 then performs again step S23 described above until a communication between the serial communication circuit 160 and the secure element 200 is completed.

Figure 4H:
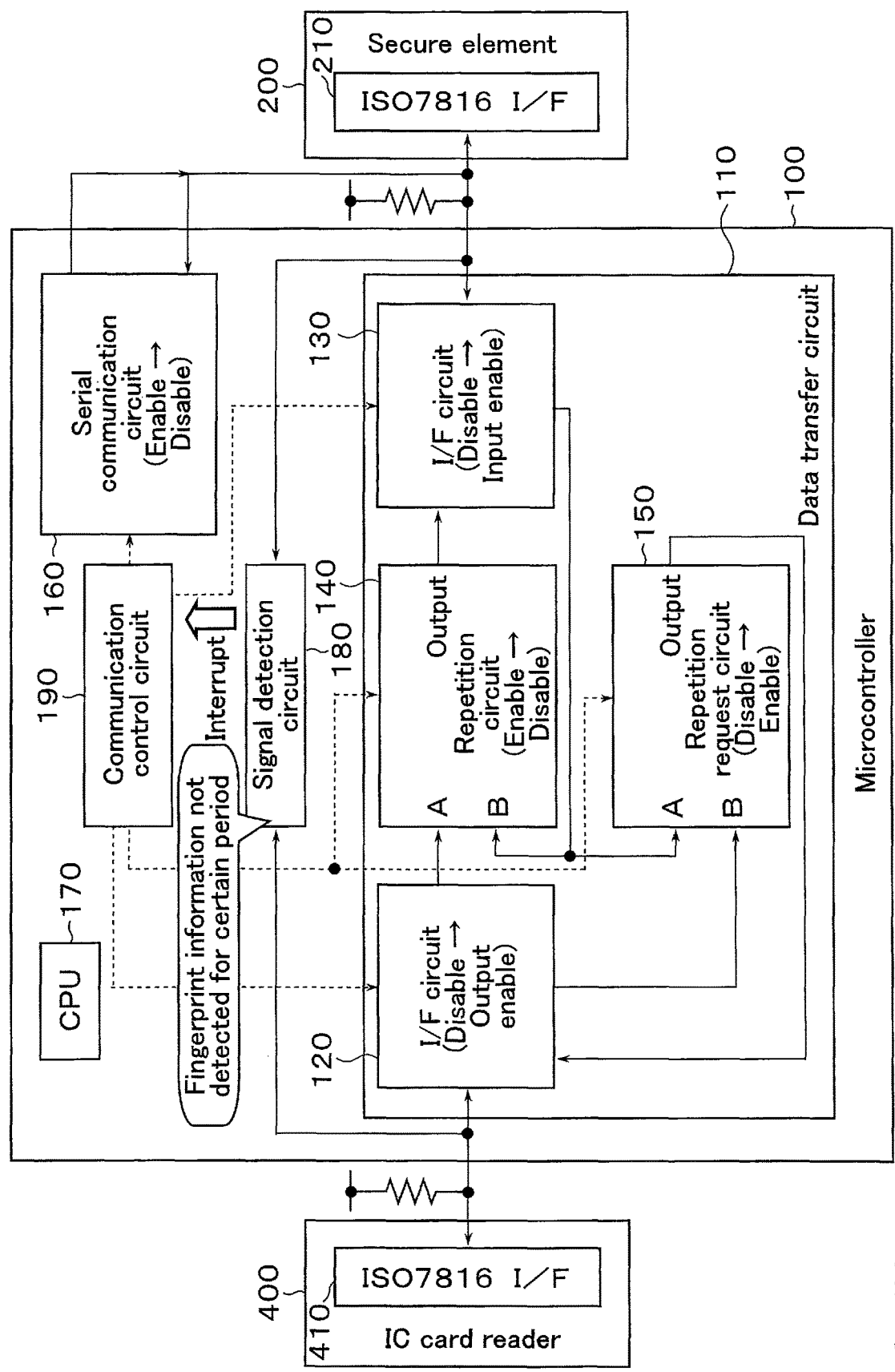
FIG. 4H is a block diagram showing the microcontroller according to the first embodiment.
Figure 4I:
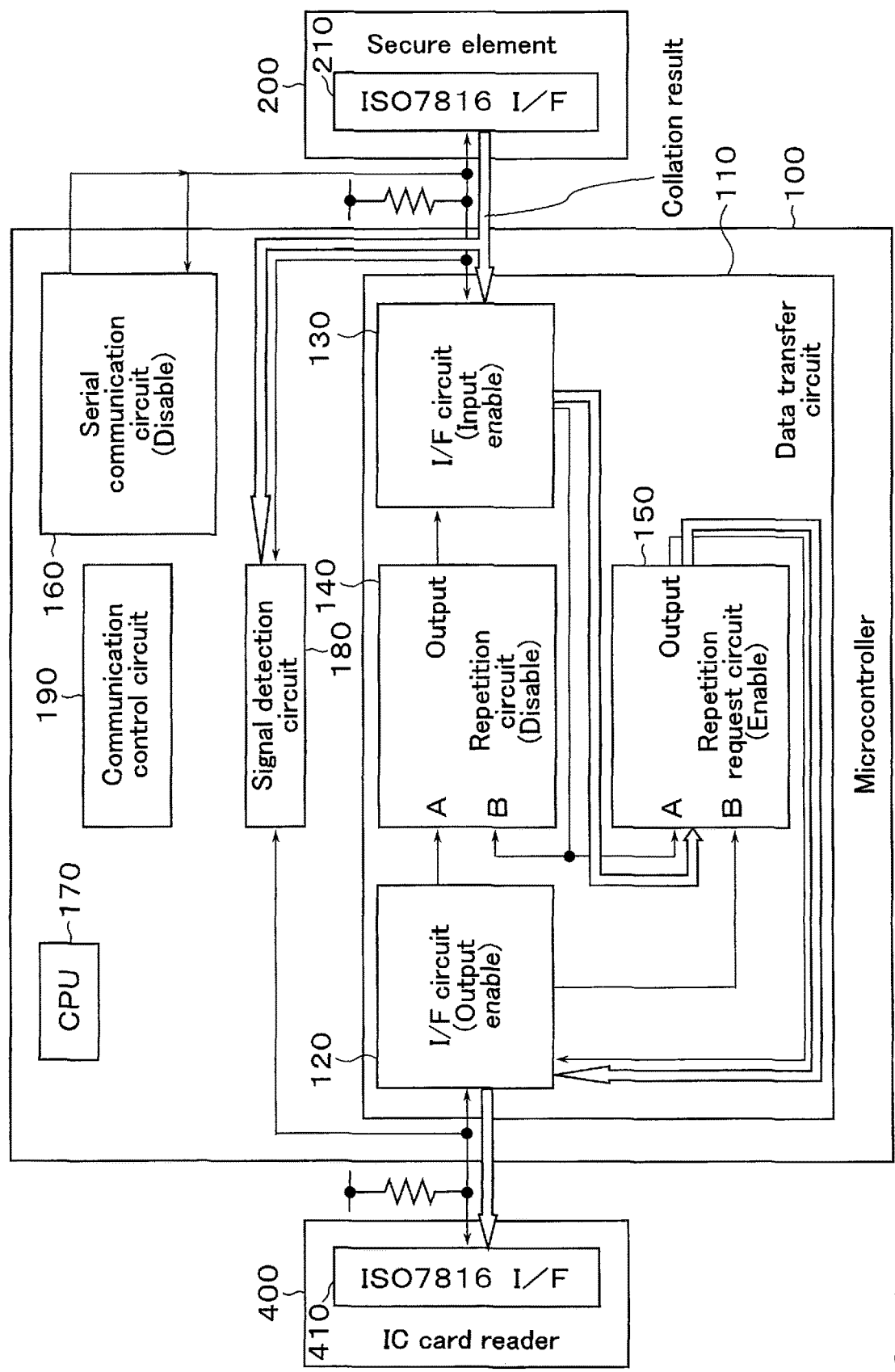
FIG. 4I is a block diagram showing the microcontroller according to the first embodiment.

FIGS. 4H and 4I illustrate operation of the microcontroller 100 and transfer of a signal including a collation result in FIG. 4C. FIG. 4H is a block diagram showing the microcontroller 100 when steps S23 to S25 in FIG. 4C are executed. FIG. 4I is a block diagram showing the microcontroller 100 when steps S26 to S31 in FIG. 4C are executed.

As shown in FIG. 4H, if the signal detection circuit 180 does not detect for a certain period, a signal including user fingerprint information that transits over the ISO7816 bus, the communication control circuit 190 changes the setting of states of the interface circuits 120 and 130, the repetition circuit 140, the repetition request circuit 150, and the serial communication circuit 160 based on a signal received from the signal detection circuit 180. Specifically, the communication control circuit 190 changes states of the interface circuits 120 and 130 respectively into the "output enable" state and the "input enable" state, the repetition circuit 140 into the "disable" state, the repetition request circuit 150 into the "enable" state, and the serial communication circuit 160 into the "disable" state. In this condition, next, a signal including a collation result is transmitted from the secure element 200 to the IC card reader 400, as shown in FIG. 4I. This signal including the collation result is then transferred in its current form to the ISO7816 interface circuit 410 of the IC card reader 400 by way of the interface circuit 130, the repetition request circuit 150, and the interface circuit 120 within the data transfer circuit 110.

Regarding a signal that the microcontroller 100 receives from the secure element 200, the whole description contains the expression that the microcontroller 100 transfers this signal "in its current form" to the IC card reader 400, and the expression that this signal "passes through" the microcontroller 100 and is transferred to the IC card reader 400. However, these expressions do not always indicate the case in which a signal is completely unchanged. Specifically, the description of the expressions for a signal that the microcontroller 100 receives from the IC card reader 400 and transfers to the secure element 200 is applied to the above expressions.

1.3 Advantageous Effects of Present Embodiment

The configuration according to the present embodiment can improve the communication performance of the microcontroller 100. The advantageous effects of the present embodiment will be described below.

In the present embodiment, the microcontroller 100 includes the data transfer circuit 110. The data transfer circuit 110 functions as a signal path that allows data transfer between the IC card reader 400 and the secure element 200 without the intervention of a CPU 170. This allows a communication between the IC card reader 400 and the secure element 200 to be performed in a similar manner to a direct communication between the ISO7816 interface circuit 410 of the IC card reader 400 and the ISO7816 interface circuit 210 of the secure element 200. Accordingly, communication performance can be improved. Furthermore, the microcontroller 100 is arranged between the IC card reader 400 and the secure element 200 in such a manner that the microcontroller 100 transfers a received signal in its current form by way of the data transfer circuit 110 of the microcontroller 100. This allows the microcontroller 100 to be applied to an existing secure element having no serial communication circuit. Accordingly, a contact IC card can be produced inexpensively.

2. Second Embodiment

A microcontroller according to the second embodiment will be described. The present embodiment is configured in such a manner to request repetition of a communication character under the T=0 communication protocol if a communication character received by the secure element 200 has an error in parity. The configuration of the microcontroller 100 is the same as that shown in FIG. 2. Hereinafter, only the matters different from the first embodiment will be described.

2.1 Operation of Microcontroller 100

Figure 5A:
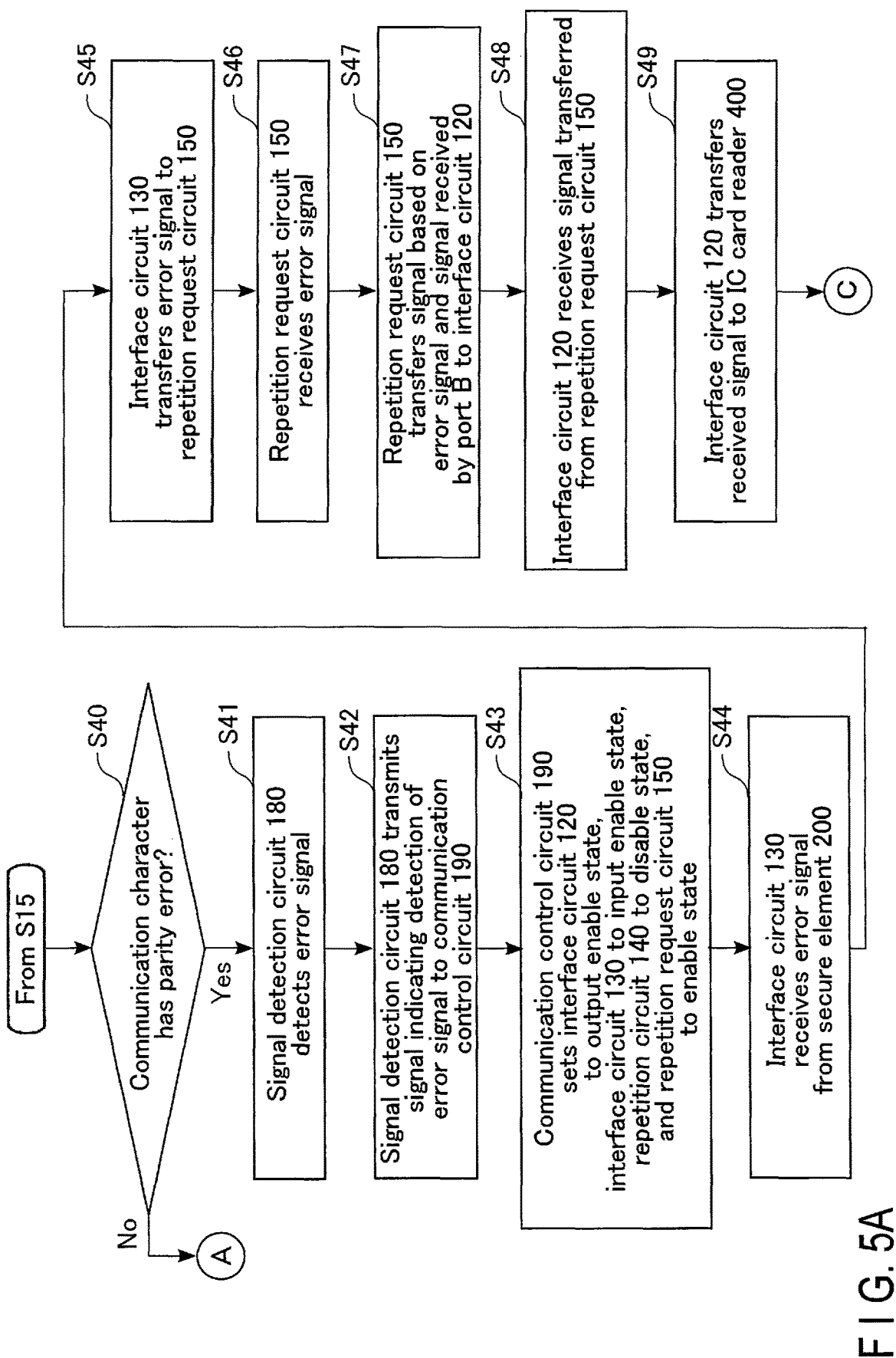
FIG. 5A is a flow chart showing operation in a microcontroller according to a second embodiment at the time of making a repetition request for a communication character.
Figure 5B:
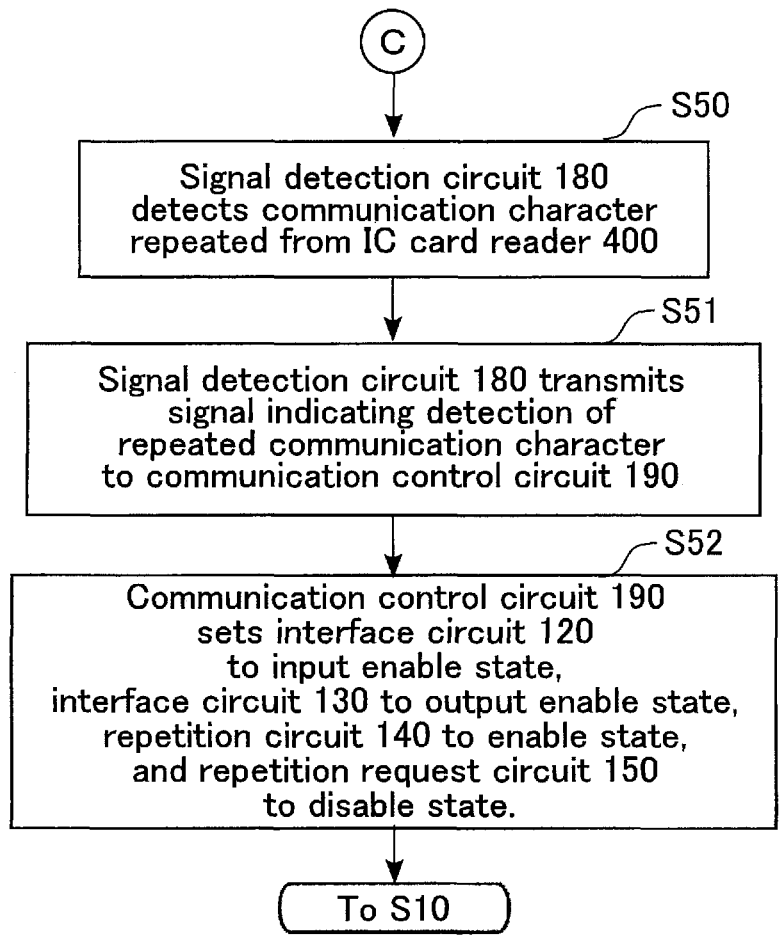
FIG. 5B is a flow chart showing operation in the microcontroller according to the second embodiment at the time of repeating the communication character.

Operation of the microcontroller 100 will be described. FIGS. 5A and 5B are each a flow chart showing operation of the microcontroller 100 according to the present embodiment. Symbol A in FIG. 5A is continuous with symbol A in FIG. 4A in chronological order. Symbol C in FIG. 5A is continuous with symbol C in FIG. 5B in chronological order. Step S40 in FIG. 5A is performed after step S15 in FIG. 4A. Step S10 in FIG. 4A is performed after step S52 in FIG. 5B.

First, operation of the microcontroller 100 when repetition of a communication character is requested will be described with reference to FIG. 5A.

As shown in FIG. 5A, first, steps S10 to S15 described above are performed.

When a communication character received by the secure element 200 has an error in parity (step S40, Yes), if the secure element 200 transmits an error signal indicative of a parity error (1-bit signal of level "L"), the signal detection circuit 180 detects the error signal that transits over the ISO7816 bus (step S41).

In the case of detecting the error signal that transits over the ISO7816 bus, the signal detection circuit 180 transmits, to the communication control circuit 190, a signal indicating the fact that the error signal has been detected (step S42). The communication control circuit 190 then determines that a request for repetition of a communication character is to be made to the IC card reader 400, and sets the interface circuit 120 to the "output enable" state, the interface circuit 130 to the "input enable" state, the repetition circuit 140 to the "disable" state, and the repetition request circuit 150 to the "enable" state (step S43).

When the setting of the states is thus changed, the interface circuit 130 receives the error signal from the secure element 200 (step S44). The interface circuit 130 then transfers the error signal to the repetition request circuit 150 (step S45).

Upon receipt of the error signal (step S46), the repetition request circuit 150 transfers, to the interface circuit 120, a signal based on the received error signal and a signal received by way of the port B (step S47). At this time, as described with reference to FIG. 3A, the port B receives a signal of level "H". Thus, the repetition request circuit 150 determines that repetition of a communication character is necessary, and thus requests repetition of a communication character by outputting a signal of level "L". Specifically, the error signal received from the secure element 200 is transferred in its current form to the interface circuit 130.

Upon receipt of the signal (error signal) transferred from the repetition request circuit 150 (step S48), the interface circuit 120 transfers this error signal to the IC card reader 400 (step S49). Specifically, the signal transmitted from the secure element 200 passes through the microcontroller 100, thereby being transferred to the IC card reader 400. In steps S40 to S49, the processor 170 does not perform a computation using the error signal. In other words, a signal transferred in steps S40 to S49 from the secure element 200 to the IC card reader 400 has no effect on operation of the processor 170 of the microcontroller 100.

On the other hand, if a communication character received by the secure element 200 has no error in parity (step S40, No), steps S16 to S31 described above are performed. In this respect, the difference from the first embodiment is that a branch condition in step S16 of the second embodiment is: "if the signal detection circuit 180 does not detect a communication character or an error signal for a certain period".

Figure 5C:
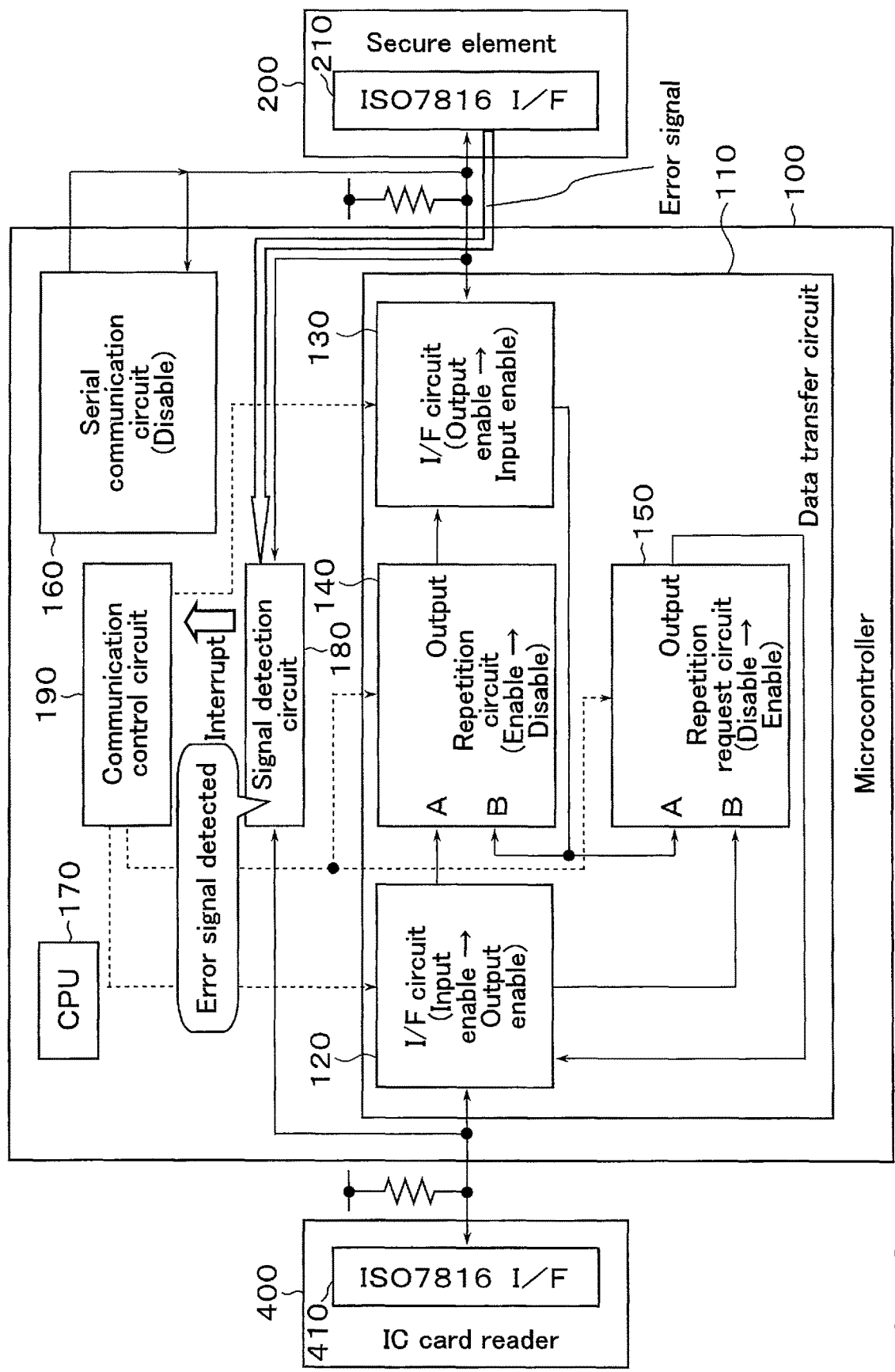
FIG. 5C is a block diagram showing the microcontroller according to the second embodiment.
Figure 5D:
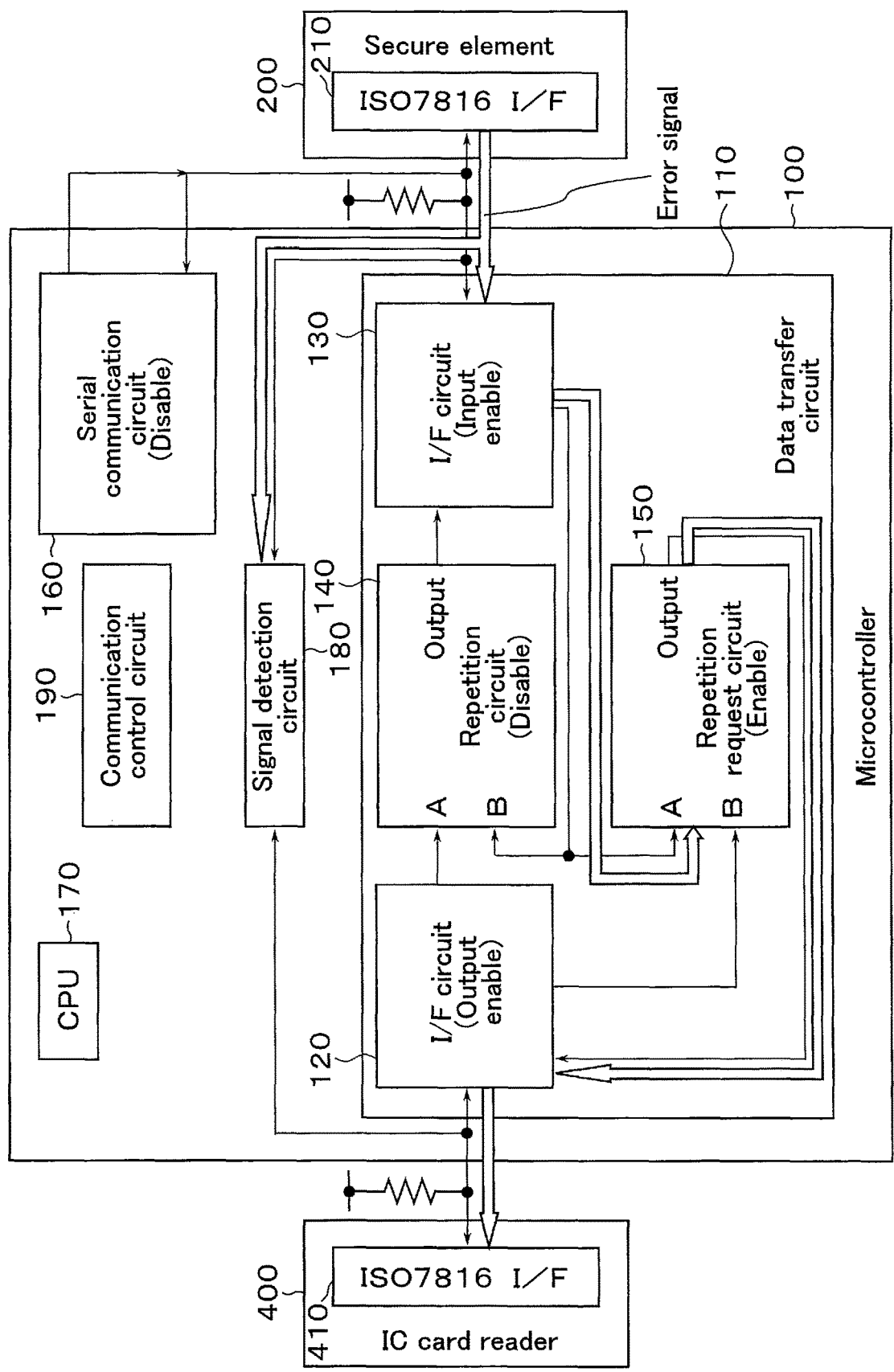
FIG. 5D is a block diagram showing the microcontroller according to the second embodiment.

FIGS. 5C and 5D illustrate operation of the microcontroller 100 and transfer of an error signal in FIG. 5A. FIG. 5C is a block diagram showing the microcontroller 100 when steps S40 to S43 in FIG. 5A are executed. FIG. 5D is a block diagram showing the microcontroller 100 when steps S44 to S49 in FIG. 5A are executed.

As shown in FIG. 5C, if the signal detection circuit 180 detects an error signal that transits over the ISO7816 bus, the communication control circuit 190 changes the setting of states of the interface circuits 120 and 130, the repetition circuit 140, and the repetition request circuit 150 based on a signal received from the signal detection circuit 180. Specifically, states of interface circuits 120 and 130 are respectively changed to the "output enable" state and the "input enable" state, a state of the repetition circuit 140 is changed to the "disable" state, and a state of the repetition request circuit 150 is changed to the "enable" state. In this condition, as shown in FIG. 5D, an error signal is subsequently transmitted from the secure element 200 to the IC card reader 400. This error signal is then transferred in its current form to the ISO7816 interface circuit 410 of the IC card reader 400 by way of the interface circuit 130, the repetition request circuit 150, and the interface circuit 120 within the data transfer circuit 110.

Regarding a signal that the microcontroller 100 receives from the secure element 200, the whole description contains the expression that the microcontroller 100 transfers this signal "in its current form" to the IC card reader 400, and the expression that this signal "passes through" the microcontroller 100 and is transferred to the IC card reader 400. However, as in the first embodiment, these expressions do not always indicate the case in which a signal is completely unchanged.

Next, operation of the microcontroller 100 when a communication character is repeated will be described with reference to FIG. 5B.

As shown in FIG. 5B, if the IC card reader 400 repeats a communication character after receiving an error signal, the signal detection circuit 180 detects the repeated communication character that transits over the ISO7816 bus (step S50).

In the case of detecting the repeated communication character that transits over the ISO7816 bus, the signal detection circuit 180 transmits to the communication control circuit 190 a signal indicating the fact that the repeated communication character has been detected (step S51). In order to transmit the repeated communication character to the secure element 200, the communication control circuit 190 then sets the interface circuit 120 to the "input enable" state, the interface circuit 130 to the "output enable" state, the repetition circuit 140 to the "enable" state, and the repetition request circuit 150 to the "disable" state (step S52).

When the setting of the states is thus changed, steps S10 to S15 described above are performed again.

Figure 5E:
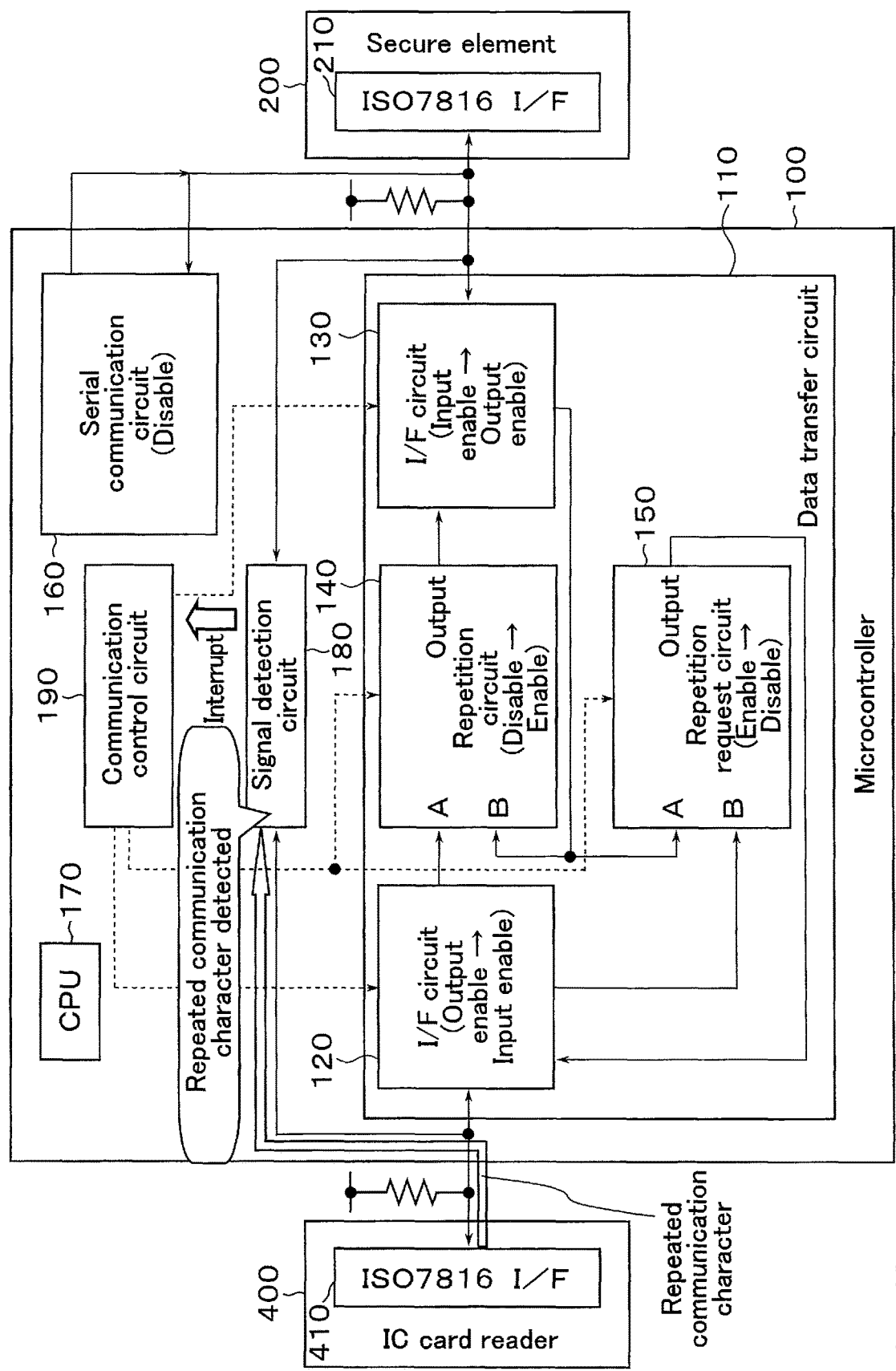
FIG. 5E is a block diagram showing the microcontroller according to the second embodiment.
Figure 5F:
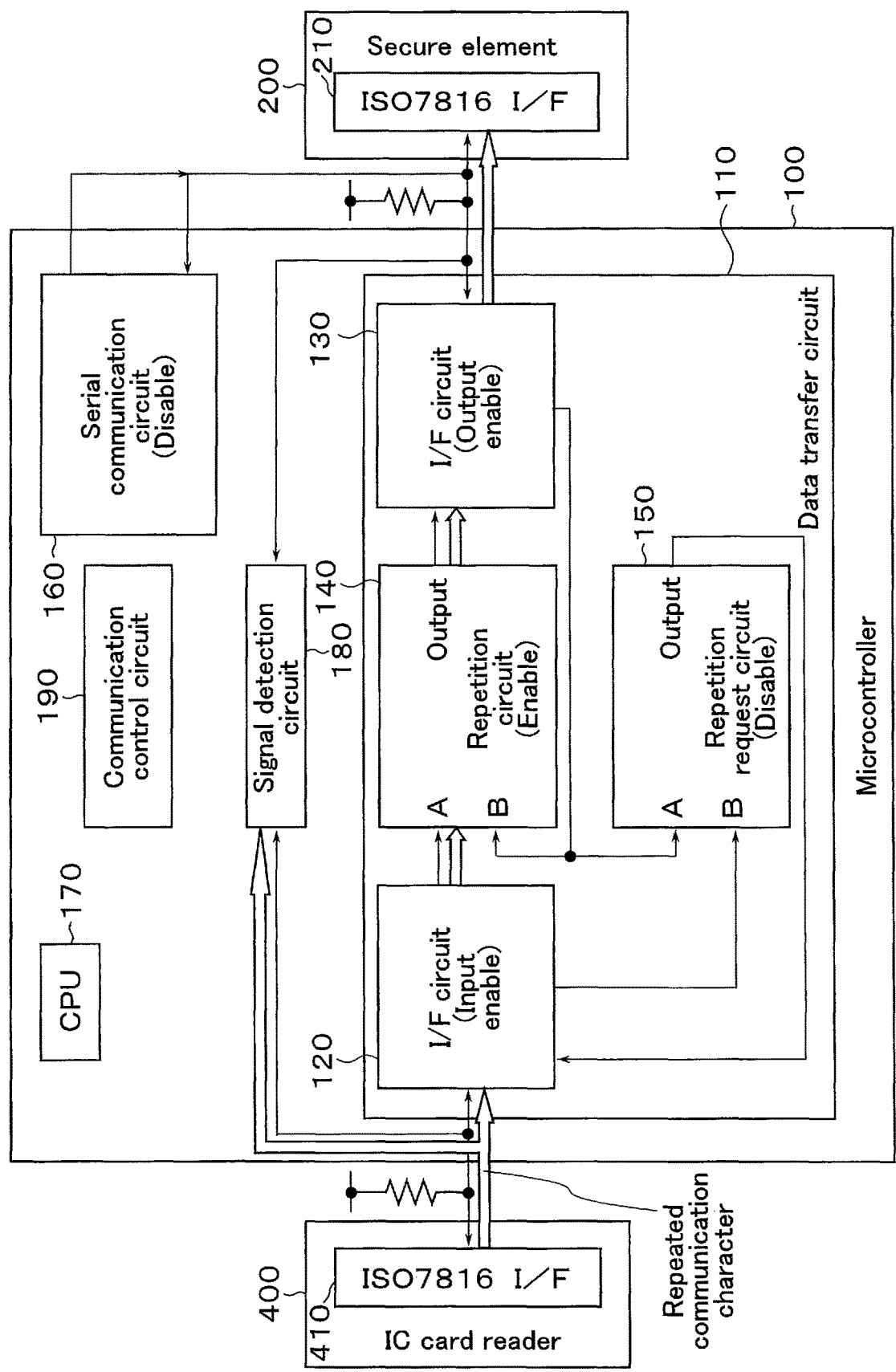
FIG. 5F is a block diagram showing the microcontroller according to the second embodiment.

FIGS. 5E and 5F illustrate operation of the microcontroller 100 and transfer of a repeated communication character in FIG. 5B. FIG. 5E is a block diagram showing the microcontroller 100 when steps S50 to S52 in FIG. 5B are executed. FIG. 5F is a block diagram showing the microcontroller 100 when steps S10 to S15 in FIG. 4A are executed.

As shown in FIG. 5E, if the signal detection circuit 180 detects the repeated communication character that transits over the ISO7816 bus, the communication control circuit 190 changes the setting of the states of the interface circuits 120 and 130, the repetition circuit 140, and the repetition request circuit 150 based on a signal received from the signal detection circuit 180. Specifically, states of the interface circuits 120 and 130 are respectively changed to the "input enable" state and the "output enable" state, a state of the repetition circuit 140 is changed to the "enable" state, and a state of the repetition request circuit 150 is changed to the "disable" state. In this condition, a communication character is subsequently repeated from the IC card reader 400 to the secure element 200 as shown in FIG. 5F. This repeated communication character is then transferred in its current form to the ISO7816 interface circuit 210 of the secure element 200 by way of the interface circuit 120, the repetition circuit 140, and the interface circuit 130 within the data transfer circuit 110.

Regarding a signal that the microcontroller 100 receives from the IC card reader 400, the present embodiment contains the expression that the microcontroller 100 transfers this signal "in its current form" to the secure element 200, and the expression that this signal "passes through" the microcontroller 100 and is transferred to the secure element 200. However, as in the first embodiment, these expressions do not always indicate the case in which a signal is completely unchanged.

2.2 Advantageous Effects of Second Embodiment

The configuration according to the present embodiment can improve the operational reliability of the microcontroller 100. Hereinafter, the advantageous effects of the second embodiment will be described.

In the present embodiment, the microcontroller 100 includes the data transfer circuit 110 allowing data transfer between the IC card reader 400 and the secure element 200 without the intervention of a CPU 170. The data transfer circuit 110 includes the repetition circuit 140 and the repetition request circuit 150. With this configuration, if a communication character has an error in parity, the secure element 200 requests repetition by transmitting an error signal to the IC card reader 400 by way of the repetition request circuit 150. The IC card reader 400, in receipt of this error signal, repeats the communication character to the secure element 200 by way of the repetition circuit 140. Accordingly, communication reliability can be improved between the IC card reader 400 and the secure element 200.

3. Modification, Etc.

As described above, a microcontroller according to the embodiments includes a processor (CPU 170) and a signal path (data transfer circuit 110) that allows a signal conforming to the ISO7816 standard to be transferred between a card reader (400) and a secure element (200) without intervention of the processor.

The microcontroller according to the above embodiments may further includes a first interface circuit (serial communication circuit 160) configured to perform a serial communication with the secure element (200). The microcontroller includes a first mode (payment authentication processing mode) and a second mode (fingerprint collation mode). In the first mode, a first communication is performed between the card reader (400) and the secure element through the signal path (data transfer circuit 110), without the processor (CPU 170) performing a computation using a signal (such as a communication character) that conforms to the ISO7816 standard. In the second mode, a second communication is performed between the first interface circuit and the secure element. The processor may perform a computation using a signal received in the second communication (such as a signal including fingerprint information).

The microcontroller according to the above embodiments may further includes a detection circuit (180) and a control circuit (190). The detection circuit is configured to detect a first signal (a communication character or a parity error signal) transmitted from the card reader (400) and the secure element (200). The control circuit invalidates the first communication and validates the second communication by switching from the first mode (payment authentication processing mode) to the second mode (fingerprint collation mode) if the detection circuit does not detect the first signal for a certain period in the first mode (payment authentication processing preparation is completed).

The microcontroller according to the above embodiments may further includes a detection circuit (180) and a control circuit (190). The detection circuit is configured to detect a first signal transmitted from the card reader (400) and the secure element (200). The control circuit invalidates the second communication and validates the first communication by switching from the second mode (finger collation mode) to the first mode (payment authentication processing mode) if the detection circuit does not detect the first signal for a certain period in the second mode (fingerprint collation is completed).

Each of the above embodiments is independently implementable. For example, the repetition request function and the repetition function described in the second embodiment are implementable without being premised on the first embodiment. The order in each of the flow charts shown in FIGS. 4A to 4C, 5A, and 5B can be shuffled to the extent possible.

Regarding a signal that the microcontroller 100 transfers between the IC card reader 400 and the secure element 200 in the above embodiments, level "L"/"H" of this signal may be reversed. For example, an error signal may be a 1-bit error signal of level "H".

In the above embodiments, the contact IC card 1 was described as an example. However, the above embodiments are applicable to any device that uses secure data. Furthermore, in the above embodiment, the case in which the contact IC card 1 is a credit card was described as an example. However, the above embodiments are not limited to this case, and are applicable to other types of IC card. In the above embodiments, the case in which the contact IC card 1 equipped with a fingerprint verification function was explained as an example. However, the above embodiments are not limited to the case of the fingerprint verification function, and are applicable to other biometric verification function.

The data transfer circuit 110 may have any configuration that allows received data to be transferred in its current form. In the above embodiments, the data transfer circuit 110 including two circuits (the repetition circuit 140 and the repetition request circuit 150) was described as an example. However, the data transfer circuit 110 may include one circuit instead of the two circuits, provided that a repetition request function and a repetition function can be realized. In the above embodiments, the case in which the microcontroller 100 includes the signal detection circuit 180 was described as an example. However, the embodiments are not limited to the signal detection circuit 180, provided that a communication character, an error signal, etc. can be detected.

In the above embodiments, the case in which a communication between the IC card reader 400 and the secure element 200 is realized by way of the ISO7816 interface of the microcontroller 100 was described as an example. However, the above embodiments are not limited to the ISO7816 interface and are applicable to other interfaces conforming to other standards.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A microcontroller comprising:
a processor;
a signal path that allows a signal conforming to an ISO7816 standard to be transferred between a card reader and a secure element without intervention of the processor; and
a first interface circuit configured to perform a serial communication with the secure element,
wherein the microcontroller includes a first mode and a second mode,
wherein in the first mode, a first communication is performed between the card reader and the secure element through the signal path without the processor performing a computation using the signal conforming to the ISO7816 standard, and wherein in the second mode, a second communication is performed between the first interface circuit and the secure element, and the processor performs a computation using a signal received in the second communication.

2. The microcontroller according to claim 1,
wherein the signal path comprises:
a second interface circuit connectable to the card reader; and
a third interface circuit connectable to the secure element, and
wherein when the microcontroller is connected to the card reader, the second interface circuit enters a state in which receiving signals from the card reader is possible, the third interface circuit enters a state in which output of signals to the secure element is possible, and the first interface circuit enters a state in which performance of the serial communication with the secure element is not possible.

3. The microcontroller according to claim 1, further comprises:
a detection circuit configured to detect a first signal transmitted from the card reader and the secure element; and
a control circuit that invalidates the first communication and validates the second communication by switching from the first mode to the second mode if the detection circuit does not detect the first signal for a certain period in the first mode.

4. The microcontroller according to claim 3,
wherein the signal path comprises:
a second interface circuit connectable to the card reader; and
a third interface circuit connectable to the secure element, and
wherein if the detection circuit does not detect the first signal for a certain period in the first mode, the second interface circuit is set to a state in which input and output of signals with respect to the card reader is not possible, the third interface circuit is set to a state in which input and output of signals with respect to the secure element is not possible, and the first interface circuit is set to a state in which performance of the serial communication with the secure element is possible.

5. The microcontroller according to claim 3,
wherein the first signal transmitted from the secure element is an error signal that relates to the signal conforming to the ISO7816 standard and has been transferred from the card reader to the secure element in the first communication, and
wherein the signal path further comprises a repetition request circuit that makes a repetition request for the signal conforming to the ISO7816 standard with respect to the card reader, based on the first signal, if the detection circuit detects the first signal transmitted from the secure element within the certain period in the first mode.

6. The microcontroller according to claim 5,
wherein the signal path comprises:
a second interface circuit connectable to the card reader; and
a third interface circuit connectable to the secure element, and wherein if the detection circuit detects the first signal transmitted from the secure element within the certain period in the first mode, the second interface circuit is set to a state in which output of signals to the card reader is possible, the third interface circuit is set to a state in which receiving signals from the secure element is possible, and the repetition request circuit is set to a state in which input and output of signals with respect to the second interface circuit is possible, and receiving signals from the third interface circuit is possible.

7. The microcontroller according to claim 5,
wherein the first signal transmitted from the card reader is a signal that conforms to the ISO7816 standard and is repeated from the card reader after the repetition request circuit makes the transmission request, and
wherein the signal path further comprises a repetition circuit that transmits to the secure element a second signal, based on the first signal and conforming to the ISO7816 standard, if the detection circuit detects the first signal transmitted from the card reader within the certain period in the first mode.

8. The microcontroller according to claim 7,
wherein the signal path comprises:
a second interface circuit connectable to the card reader; and
a third interface circuit connectable to the secure element, and
wherein if the detection circuit detects the first signal transmitted from the card reader within the certain period in the first mode, the second interface circuit is set to a state in which receiving signals from the card reader is possible, the third interface circuit is set to a state in which output of signals to the secure element is possible, the repetition circuit is set to a state in which receiving signals from the second interface circuit is possible, and input and output of signals with respect to the third interface circuit is possible, and the repetition request circuit is set to a state in which input and output of signals with respect to the second interface circuit is not possible, and receiving signals from the third interface circuit is not possible.

9. The microcontroller according to claim 7,
wherein when the microcontroller is connected to the card reader, in the first mode, the repetition circuit receives a signal conforming to the ISO7816 standard from the card reader, and transmits to the secure element a third signal that conforms to the ISO7816 standard and is based on the signal conforming to the ISO7816 standard,
wherein the error signal corresponds to a signal indicative of a parity error in the third signal,
wherein the signal repeated from the card reader corresponds to a repeated signal that conforms to the ISO7816 standard,
wherein after transition is made to the second mode by the detection circuit not having detected the first signal for the certain period, the microcontroller receives first fingerprint information from a fingerprint sensor, receives second fingerprint information from the secure element, and collates the first fingerprint information with the second fingerprint information, and
wherein the microcontroller transmits a result of the collating to the secure element.

10. The microcontroller according to claim 9, wherein the error signal is a 1-bit signal.

11. The microcontroller according to claim 1, further comprises:
- a detection circuit configured to detect a first signal transmitted from the card reader and the secure element; and
- a control circuit that invalidates the second communication and validates the first communication by switching from the second mode to the first mode if the detection circuit does not detect the first signal for a certain period in the second mode.

12. The microcontroller according to claim 11,
wherein the signal path comprises:
- a second interface circuit connectable to the card reader; and
- a third interface circuit connectable to the secure element, and wherein if the detection circuit does not detect the first signal for a certain period in the second mode, the second interface circuit is set to a state in which output of signals to the card reader is possible, the third interface circuit is set to a state in which receiving signals from the secure element is possible, and the first interface circuit is set to a state in which performance of the serial communication with the secure element is not possible.

13. The microcontroller according to claim 11,
wherein the first signal transmitted from the secure element includes user fingerprint information,
wherein if the detection circuit detects the first signal within the certain period in the second mode, the microcontroller maintains the second mode, performs fingerprint collation based on the first signal, and transmits a result of the collation to the secure element,
wherein, if the detection circuit does not detect the first signal for the certain period, the signal being transmitted from the secure element to the microcontroller in the first communication, by virtue of switching from the second mode to the first mode, includes information relating to the result of the collation.

14. The microcontroller according to claim 1,
wherein when the microcontroller is connected to the card reader, in the first mode, the microcontroller receives the signal conforming to the ISO7816 standard from the card reader, and transfers the signal conforming to the ISO7816 standard to the secure element,
wherein after the microcontroller transfers the signal conforming to the ISO7816 standard, the microcontroller transitions to the second mode, and in the second mode, the microcontroller receives first fingerprint information from a fingerprint sensor, receives second fingerprint information from the secure element, collates the first fingerprint information with the second fingerprint information, and transmits a result of the collating to the secure element, and
wherein after the microcontroller transmits the result of the collating, the microcontroller transitions to the first mode, and in the first mode, the microcontroller receives a signal including the result of the collating from the secure element, and transfers the signal including the result of the collating to the card reader.

* * * * *